(12) United States Patent
Umemoto et al.

(10) Patent No.: US 10,907,267 B2
(45) Date of Patent: Feb. 2, 2021

(54) METAL-RESIN COMPOSITE MATERIAL, METHOD FOR PRODUCING THE SAME, AND ALUMINUM SUBSTRATE HAVING ALUMINUM OXIDE COATING

(71) Applicant: KABUSHIKI KAISHA TOYOTA CHUO KENKYUSHO, Nagakute (JP)

(72) Inventors: Kazuhiko Umemoto, Nagakute (JP); Takuro Matsunaga, Nagakute (JP); Kenzo Fukumori, Nagakute (JP); Hideaki Matsuoka, Nagakute (JP); Shuxin Dong, Nagakute (JP); Hiroaki Kadoura, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 733 days.

(21) Appl. No.: 14/911,460

(22) PCT Filed: Dec. 5, 2014

(86) PCT No.: PCT/JP2014/082907
§ 371 (c)(1),
(2) Date: Feb. 10, 2016

(87) PCT Pub. No.: WO2015/083845
PCT Pub. Date: Jun. 11, 2015

(65) Prior Publication Data
US 2016/0194779 A1 Jul. 7, 2016

(30) Foreign Application Priority Data
Dec. 6, 2013 (JP) .................... 2013-253236

(51) Int. Cl.
*C25D 11/18* (2006.01)
*C25D 11/12* (2006.01)
(Continued)

(52) U.S. Cl.
CPC ............ *C25D 11/18* (2013.01); *B29C 70/683* (2013.01); *C25D 11/04* (2013.01); *C25D 11/12* (2013.01);
(Continued)

(58) Field of Classification Search
CPC ............... C25D 11/12; Y10T 428/1259; Y10T 428/249956; B32B 3/30; B32B 15/08
See application file for complete search history.

(56) References Cited

U.S. PATENT DOCUMENTS

| | | | |
|---|---|---|---|
| 5,218,472 A | 6/1993 | Jozefowicz et al. | |
| 2005/0150771 A1 | 7/2005 | Kock et al. | |

(Continued)

FOREIGN PATENT DOCUMENTS

| | | |
|---|---|---|
| CA | 2491095 A1 | 6/2005 |
| EP | 2221398 A1 | 8/2010 |

(Continued)

OTHER PUBLICATIONS

Li, A.; Muller, F.; Birner, A.; Nielsh, K.; Gosele, U.; "Hexagonal pore arrays with a 50-420 nm interpore distance formed by self-organization in anodic alumina", Journal of Applied Physics, 1998, p. 6023-6026.*

(Continued)

*Primary Examiner* — Mark Ruthkosky
*Assistant Examiner* — Julia L Rummel
(74) *Attorney, Agent, or Firm* — Oliff PLC

(57) ABSTRACT

A metal-resin composite material including an aluminum substrate having an aluminum oxide coating and a resin bonded to the aluminum substrate through the aluminum oxide coating, wherein the aluminum oxide coating has a porous surface layer in which columns with an average height of 10 to 100 nm are arranged in a dispersed state, an average value of sums of cross-sectional areas of the col- (Continued)

umns in randomly sampled 400 nm square visual fields of the porous surface layer is 8000 to 128000 $nm^2$, an average value of sums of circumferential lengths of cross-sections of the columns in randomly sampled 400 nm square visual fields of the porous surface layer is 1000 to 27000 nm, and an average value of numbers of the columns in randomly sampled 400 nm square visual fields of the porous surface layer is 10 to 430.

7 Claims, 9 Drawing Sheets

(51) Int. Cl.

| | | |
|---|---|---|
| *C25D 11/04* | (2006.01) | |
| *B29C 70/68* | (2006.01) | |
| *C25D 11/16* | (2006.01) | |
| *C25D 11/24* | (2006.01) | |
| *C25D 11/08* | (2006.01) | |
| *C25D 11/10* | (2006.01) | |
| *B32B 15/08* | (2006.01) | |
| *B32B 3/30* | (2006.01) | |
| *B29K 77/00* | (2006.01) | |
| *B29K 81/00* | (2006.01) | |
| *B29K 105/20* | (2006.01) | |
| *B29K 705/02* | (2006.01) | |

(52) U.S. Cl.
CPC ...... *B29K 2077/00* (2013.01); *B29K 2081/04* (2013.01); *B29K 2105/20* (2013.01); *B29K 2705/02* (2013.01); *B32B 3/30* (2013.01); *B32B 15/08* (2013.01); *C25D 11/08* (2013.01); *C25D 11/10* (2013.01); *C25D 11/16* (2013.01); *C25D 11/24* (2013.01); *Y10T 428/1259* (2015.01); *Y10T 428/249956* (2015.04); *Y10T 428/31678* (2015.04)

(56) References Cited

U.S. PATENT DOCUMENTS

| | | |
|---|---|---|
| 2006/0055084 A1 | 3/2006 | Yamaguchi et al. |
| 2006/0257624 A1 | 11/2006 | Naritomi et al. |
| 2010/0279108 A1 | 11/2010 | Kuroyama et al. |
| 2012/0192742 A1 | 8/2012 | Kurokawa et al. |
| 2014/0102908 A1 | 4/2014 | Kuroyama et al. |

FOREIGN PATENT DOCUMENTS

| | | |
|---|---|---|
| EP | 2481604 A1 | 8/2012 |
| JP | 2006-001216 A | 1/2006 |
| JP | 2007-050630 A | 3/2007 |
| JP | 2008-162115 A | 7/2008 |
| JP | 2008-163379 A | 7/2008 |
| JP | 2012-140670 A | 7/2012 |
| JP | 2012-157991 A | 8/2012 |
| JP | 2013-199664 A | 10/2013 |
| WO | 2004/041533 A1 | 5/2004 |
| WO | 2004/055248 A1 | 7/2004 |
| WO | 2009/078377 A1 | 6/2009 |

OTHER PUBLICATIONS

Minnon, T.; "Shared Learnings: What is Anodizing?", Tubelite Inc., 2014, p. 1-3. Accessed at https://web.archive.org/web/20150503034414/ https://www.tubeliteinc.com/shared-learnings-what-is-anodizing-part-1-of-2/.*

Kassangana, A.; "Anodized Alumina as a Template for Nanostructure Processing", Master's Thesis, McGill University, 2007, p. 39-51.*

Yuan, Z.; Huang, H.; Fan, S.; "Regular Alumina Nanopillar Arrays", Advanced Materials, 2002, vol. 14, p. 303-306.*

O'Sullivan, J.; Proc. Roy. Soc. Lond. A., 1970, 317, p. 511.*

May 20, 2015 Written Opinion issued in International Patent Application No. PCT/JP2014/082907.

May 20, 2015 International Search Report issued in International Patent Application No. PCT/JP2014/082907.

Mar. 6, 2017 Office Action issued in German Patent Application No. 11 2014 003 587.4.

Sep. 20, 2016 Office Action issued in Japanese Patent Application No. 2015-552525.

\* cited by examiner

[Fig. 1]
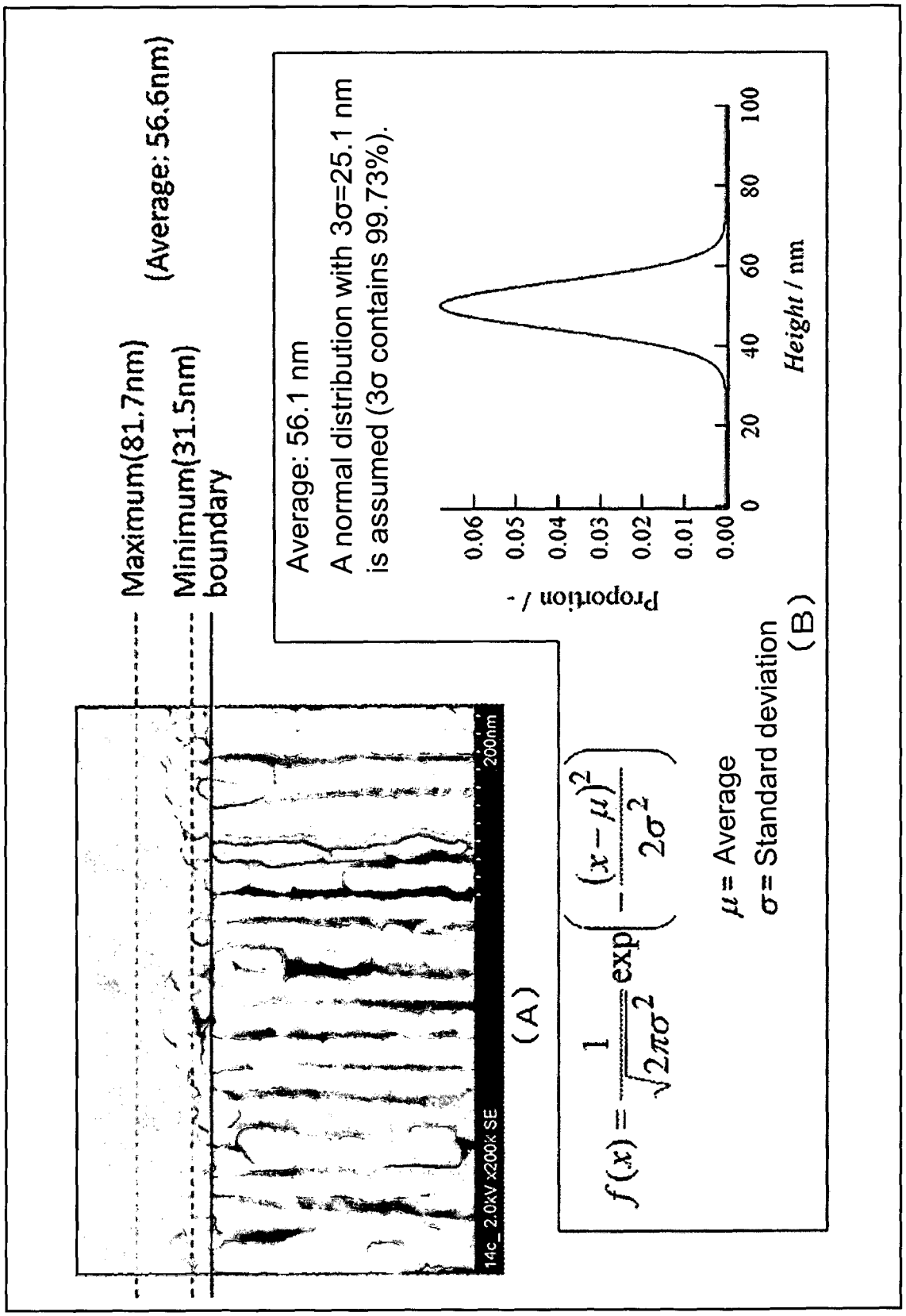

[Fig. 2]
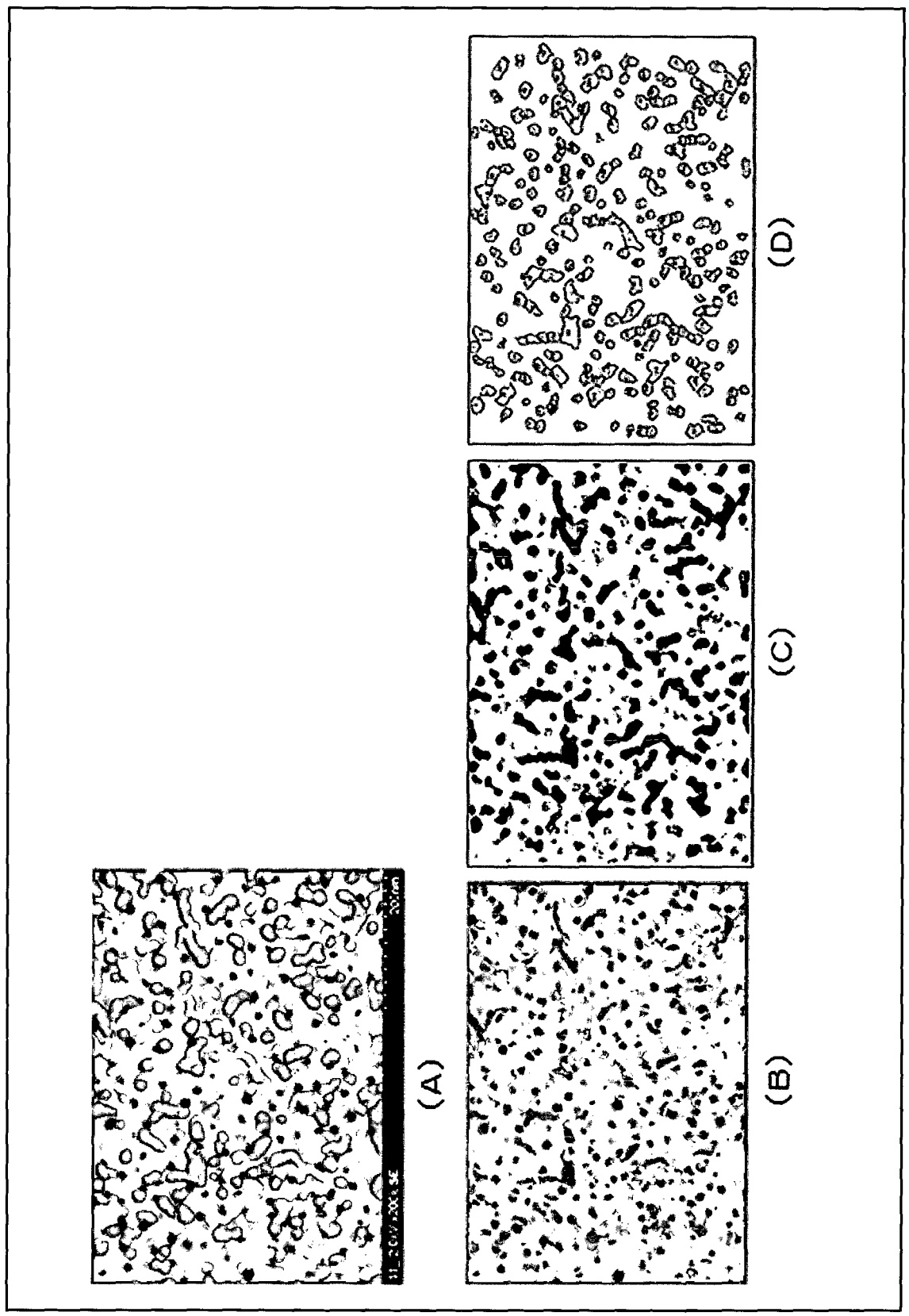

[Fig. 3]
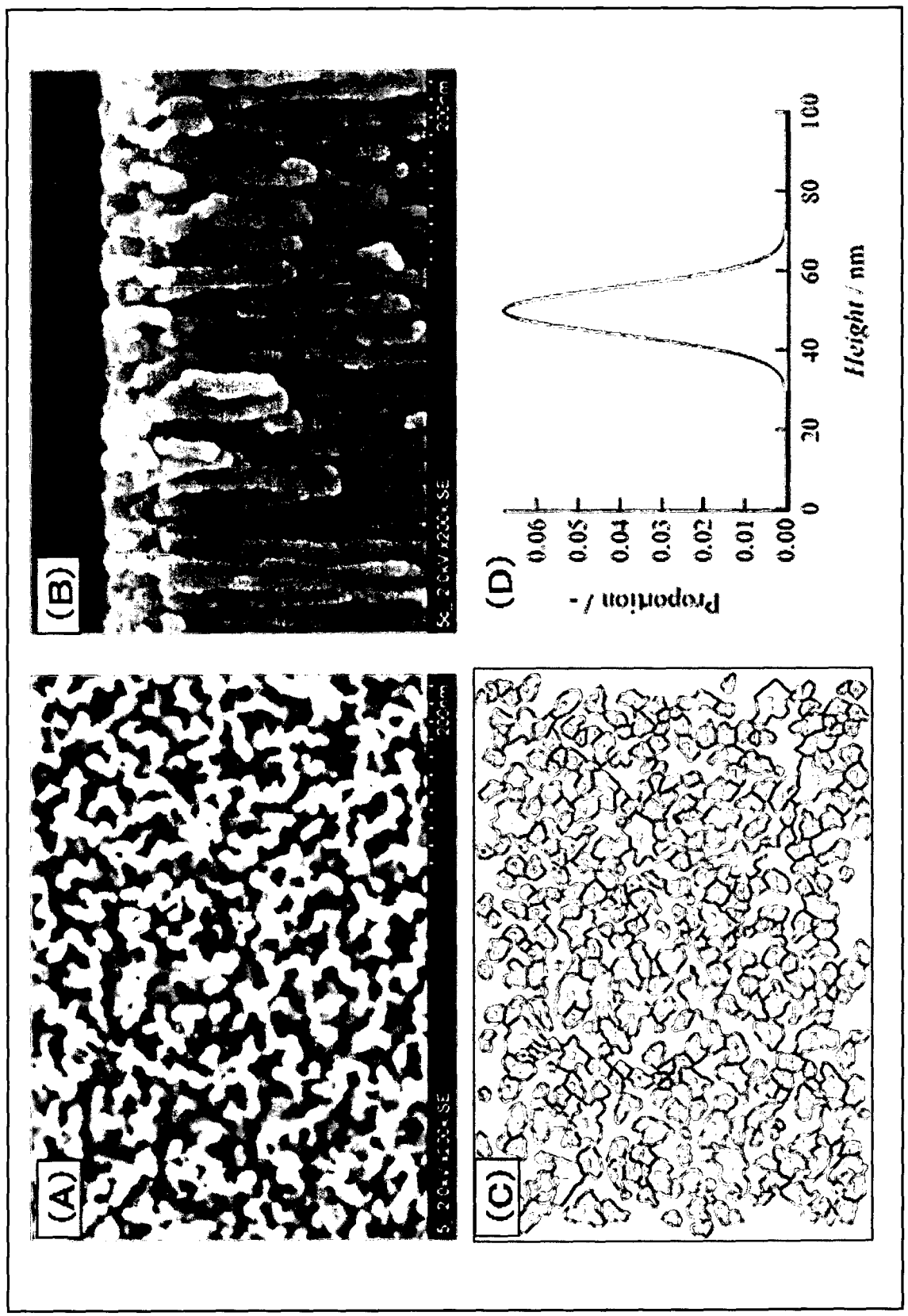

[Fig. 4]
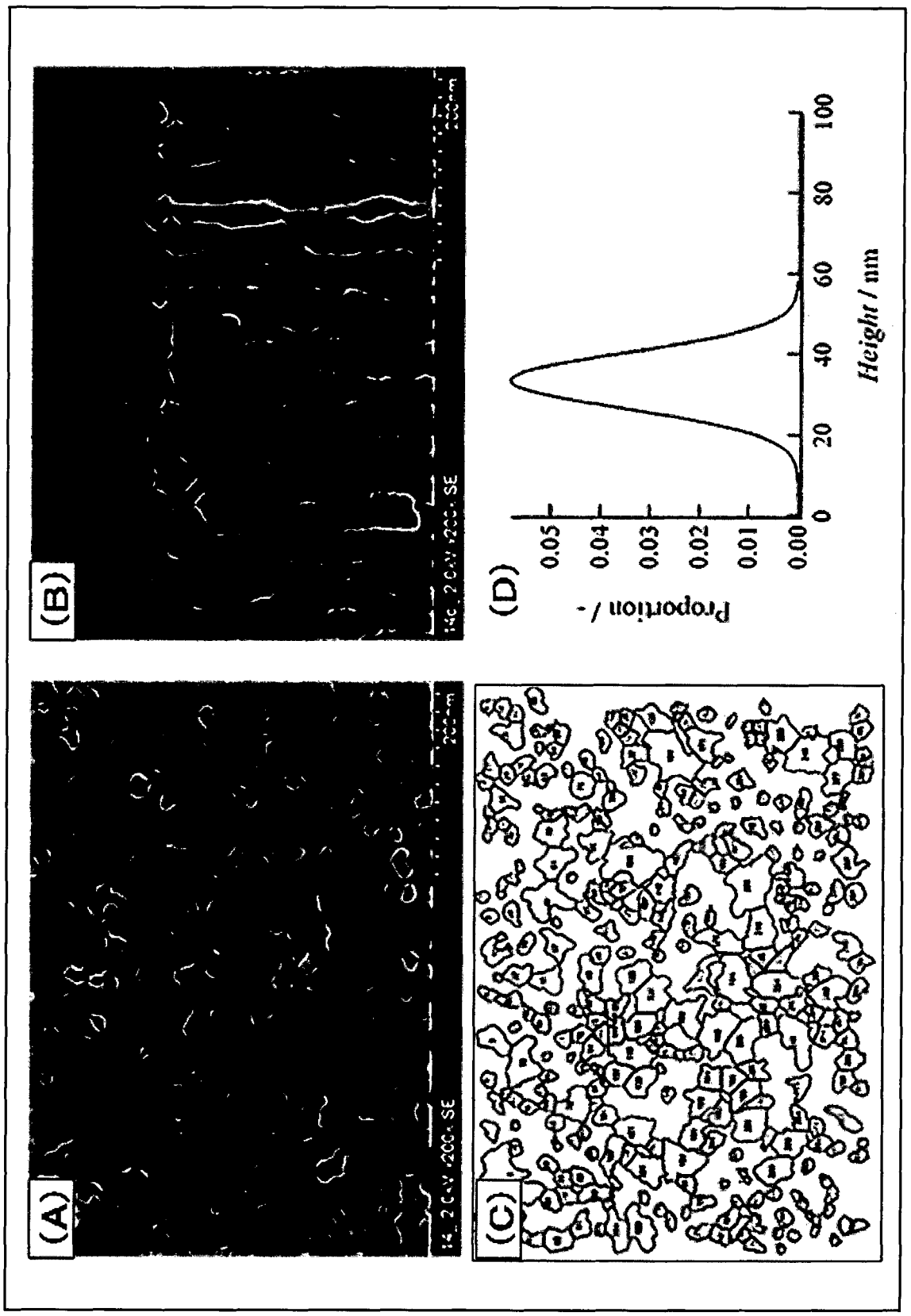

[Fig. 5]
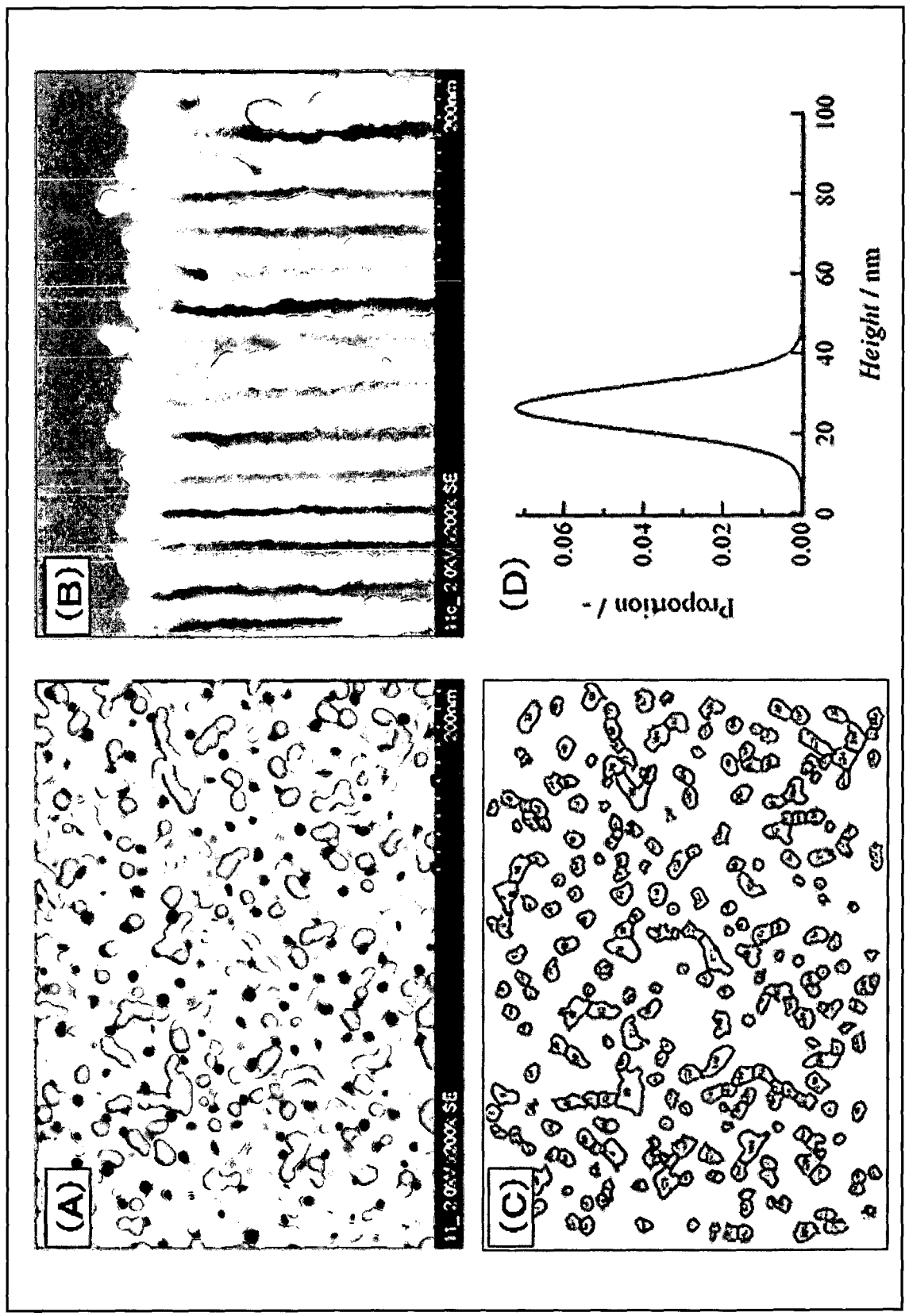

[Fig. 6]
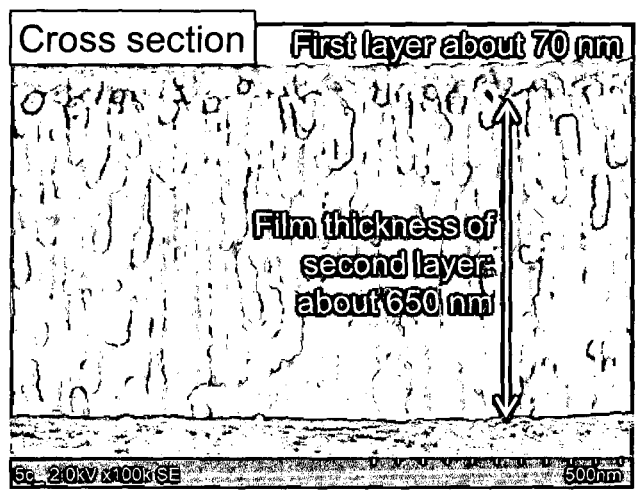

[Fig. 7]
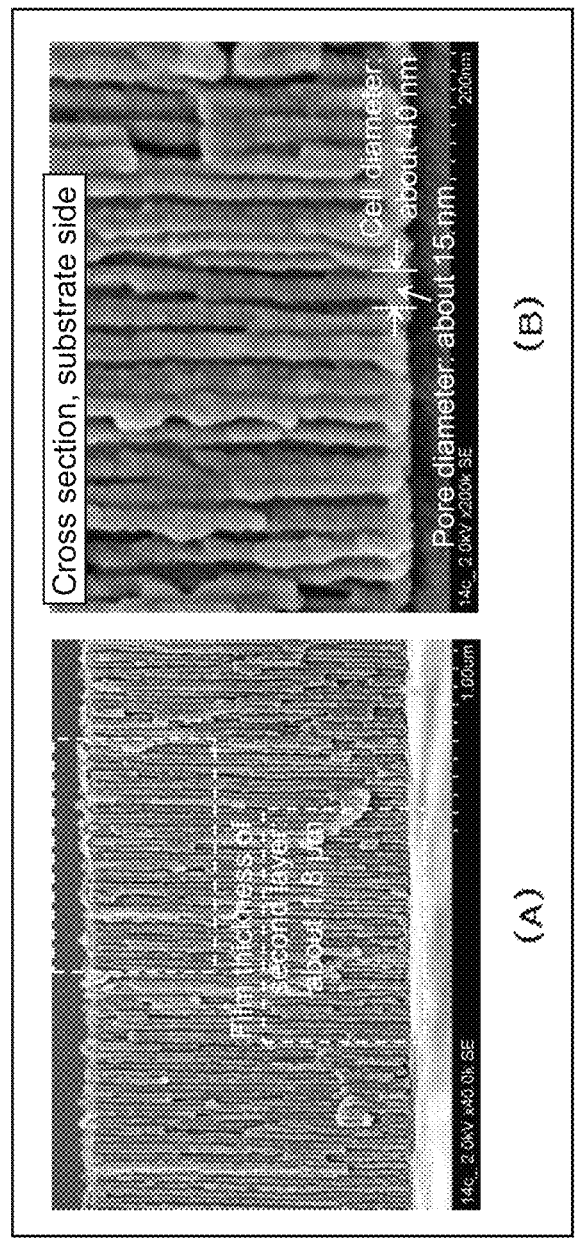

[Fig. 8]
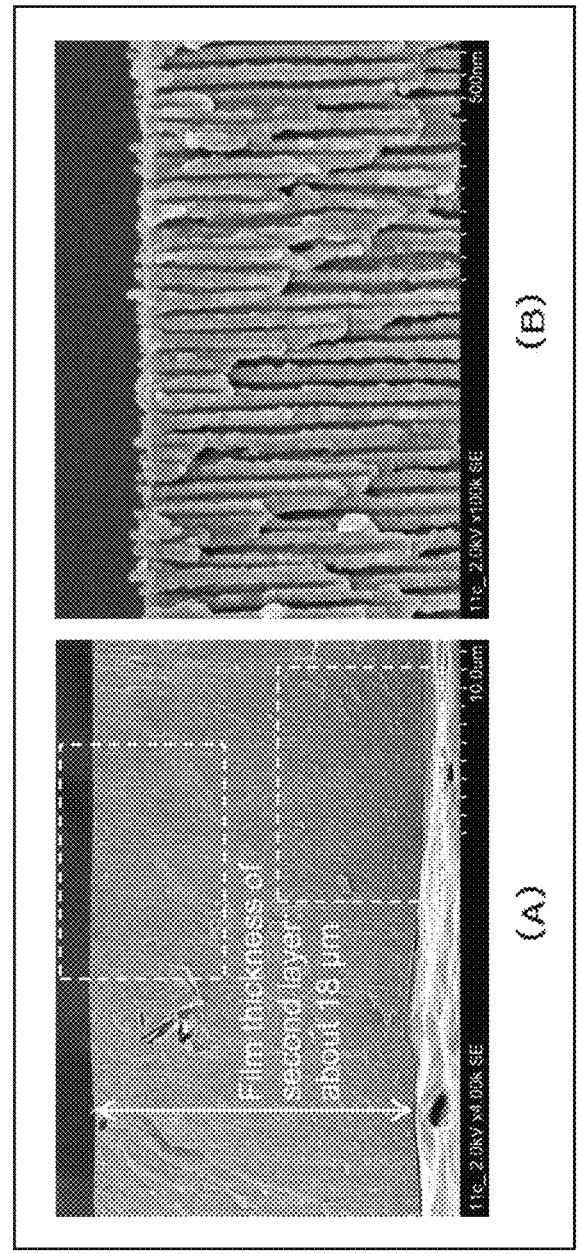

[Fig. 9]
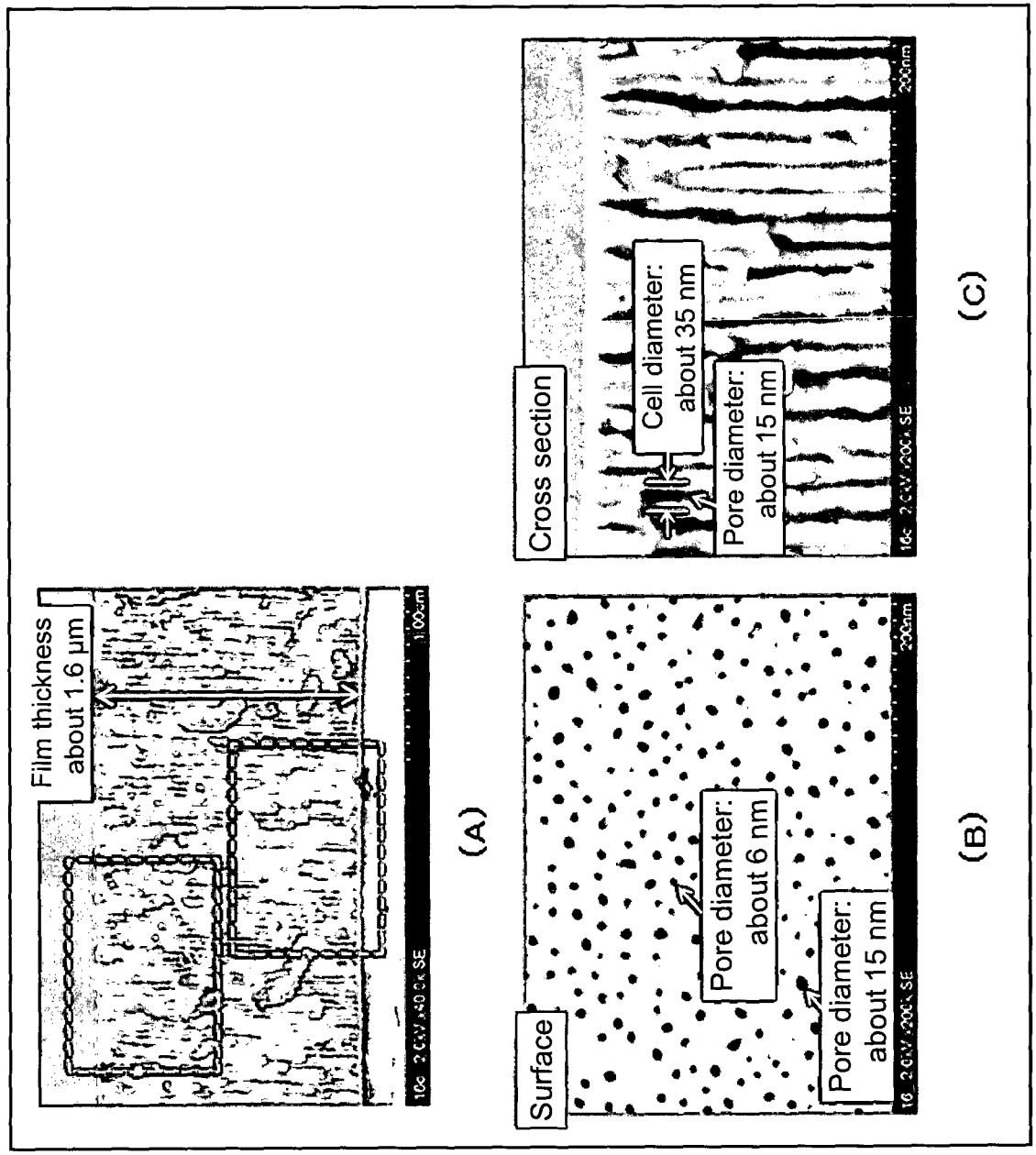

METAL-RESIN COMPOSITE MATERIAL, METHOD FOR PRODUCING THE SAME, AND ALUMINUM SUBSTRATE HAVING ALUMINUM OXIDE COATING

TECHNICAL FIELD

The present invention relates to a metal-resin composite material, a method for producing the same, and an aluminum substrate having an aluminum oxide coating.

BACKGROUND ART

It has been conventionally known that a component taking advantages of both a metal and a resin can be designed by forming a composite material of the metal and the resin. A technology for bonding or uniting a metal material and a resin material together has been required in various fields such as home appliances products, mobile phones, automobile components, personal computers, and electronic components, for example. Known methods for bonding a metal material and a resin material include bonding by welding, bonding with an adhesive agent, mechanical fixation, and the like. The bonding by welding has a problem of an insufficient strength at the bonding portion, whereas the mechanical fixation has a problem of low degree of freedom of the bonding. Recently, the bonding with an adhesive agent has been often employed for bonding a metal material and a resin material to each other. However, even when a metal material and a resin material are placed with the boundaries thereof being adjacent to each other, it is difficult to bond the metal material and the resin material to each other, because of their great differences in properties. Moreover, the bonding strength of the obtained bonded article is not necessarily sufficient. Furthermore, strict conditions for use and strict management are required. Hence, it is difficult to firmly bond a metal material and a resin material to each other in a simple manner.

As a technology for bonding or uniting a metal and a resin, for example, Japanese Unexamined Patent Application Publication No. 2007-50630 (PTL 1) discloses a composite material comprising a metal component and a resin composition component, wherein a surface of the metal component is covered with an opening portion of pores formed by the anodization method and having a number-average inner diameter of 10 to 80 nm, and the resin composition component is fixed to the metal component by injection molding and has a resin constitution of 70 to 99% by weight of polyphenylene sulfide and 1 to 30% by weight of a polyolefin-based resin. However, the conventional composite material of the metal component and the resin composition component as described in PTL 1 does not necessarily have a sufficient bonding strength between the metal material and the resin material.

Meanwhile, International Publication No. WO2004/055248 (PTL 2) discloses a composite of an aluminum material and a synthetic resin molded article which are bonded to each other in such a state that part of the synthetic resin molded article bites into and is bound to innumerable pores of an anodic oxide coating, the innumerable pores being formed in the anodic oxide coating and opened in a surface of the aluminum material and having diameters of 25 nm or larger, as well as a method for producing the composite. However, the bonding strength between the aluminum material and the synthetic resin molded article is not necessarily sufficient in the conventional composite of the aluminum material and the synthetic resin molded article as described in PTL 2, either.

Moreover, Japanese Unexamined Patent Application Publication No. 2006-1216 (PTL 3) discloses a composite material of an anodized aluminum alloy and a resin, in which a shaped article of the anodized aluminum alloy and one or more thermoplastic resin compositions are integrally bonded to each other at a to-be bonded portion described below at which an oxide layer coating of the anodized aluminum alloy is destructed. Here, the shaped article of the anodized aluminum alloy is subjected to at least an anodization treatment step, a step of destructing the oxide layer coating at the to-be bonded portion by a mechanical method, an etching step of bringing the shaped article into contact with an aqueous acidic solution, and a step of bringing the shaped article into contact with one or more selected from ammonia, hydrazine, and water-soluble amine compounds. Meanwhile, the one or more thermoplastic resin compositions are selected from thermoplastic resin compositions mainly containing polyalkylene terephthalates, polyarylene sulfides, and copolymers thereof. However, even the conventional composite article of the shaped article of the anodized aluminum alloy and the thermoplastic resin compositions as described in PTL 3 does not necessarily have a sufficient bonding strength.

Meanwhile, International Publication No. WO2009/078377 (PTL 4) discloses a resin-metal bonded body comprising an aluminum metal member and a thermoplastic resin member bonded together, wherein the aluminum metal member and thermoplastic resin member are bonded together by an anodic oxide coating having a coating thickness of 70 to 1500 nm, and the anodic oxide coating has an infrared absorption spectrum peak intensity attributable to OH groups of 0.0001 to 0.16. However, in the case of the conventional composite article of the aluminum member and the synthetic resin molded article and the method for producing the same as described in PTL 4, the bonding strength between the aluminum metal member and the thermoplastic resin member is not necessarily sufficient.

CITATION LIST

Patent Literature

[PTL 1] Japanese Unexamined Patent Application Publication No. 2007-50630
[PTL 2] International Publication No. WO2004/055248
[PTL 3] Japanese Unexamined Patent Application Publication No. 2006-1216
[PTL 4] International Publication No. WO2009/078377

SUMMARY OF INVENTION

Technical Problem

The present invention has been made in view of the problems of the above-described conventional technologies, and an object of the present invention is to provide a metal-resin composite material in which an aluminum substrate and a resin are more firmly bonded to each other, a method for producing a metal-resin composite material, by which an aluminum substrate and a resin material can be firmly bonded to each other in a simple manner, and an aluminum substrate having an aluminum oxide coating excellent in adhesion to a resin.

Solution to Problem

The present inventors have conducted intensive study to achieve the above-described object, and consequently found that, in a metal-resin composite material comprising an aluminum substrate having an aluminum oxide coating and a resin bonded to the aluminum substrate through the aluminum oxide coating, the aluminum substrate and the resin can be firmly bonded to each other, when a surface of the aluminum oxide coating is formed as a porous surface layer in which columns (protrusions, projections) of specific shapes are arranged in a dispersed state. This finding has led to the completion of the present invention.

Specifically, a metal-resin composite material of the present invention is a metal-resin composite material comprising an aluminum substrate having an aluminum oxide coating and a resin bonded to the aluminum substrate through the aluminum oxide coating, wherein the aluminum oxide coating has a porous surface layer in which columns with an average height of 10 to 100 nm are arranged in a dispersed state, an average value of sums of cross-sectional areas of the columns in randomly sampled 400 nm square visual fields of the porous surface layer is 8000 to 128000 nm$^2$, and an average value of numbers of the columns in randomly sampled 400 nm square visual fields of the porous surface layer is 10 to 430.

In the above-described metal-resin composite material of the present invention, an average value of sums of circumferential lengths of cross-sections of the columns in randomly sampled 400 nm square visual fields of the porous surface layer is preferably 1000 to 27000 nm.

In addition, in the above-described metal-resin composite material of the present invention, the aluminum oxide coating preferably further comprises a porous intermediate layer which is formed at an aluminum substrate side of the porous surface layer and which has fine recessed portions, wherein the fine recessed portions have an average pore diameter of 5 to 50 nm, and the fine recessed portions have an average inter-pore distance of 5 to 90 nm.

A method for producing a metal-resin composite material of the present invention is a method for producing a metal-resin composite material comprising an aluminum substrate having an aluminum oxide coating and a resin bonded to the aluminum substrate through the aluminum oxide coating, the method comprising:

a surface treatment step of subjecting an aluminum substrate to an anodization treatment to form, on a surface of the aluminum substrate, an aluminum oxide coating having a porous surface layer in which columns with an average height of 10 to 100 nm are arranged in a dispersed state, an average value of sums of cross-sectional areas of the columns in randomly sampled 400 nm square visual fields being 8000 to 128000 nm$^2$, and an average value of numbers of the columns in randomly sampled 400 nm square visual fields being 10 to 430; and a bonding step of bonding the aluminum substrate to a resin through the aluminum oxide coating having the porous surface layer and formed in the surface treatment step.

In the above-described method for producing a metal-resin composite material of the present invention, an average value of sums of circumferential lengths of cross-sections of the columns in randomly sampled 400 nm square visual fields is preferably 1000 to 27000 nm in the porous surface layer of the aluminum oxide coating formed on the surface of the aluminum substrate.

In addition, in the above-described method for producing a metal-resin composite material of the present invention, the aluminum oxide coating comprising the porous surface layer and a porous intermediate layer is preferably formed on the surface of the aluminum substrate in the surface treatment step, the porous intermediate layer formed at an aluminum substrate side of the porous surface layer and having fine recessed portions, the porous intermediate layer having an average film thickness of 500 nm to 20 µm, the fine recessed portions having an average pore diameter of 5 to 50 nm, and the fine recessed portions having an average inter-pore distance of 5 to 90 nm.

An aluminum substrate having an aluminum oxide coating of the present invention is an aluminum substrate comprising an aluminum oxide coating, wherein the aluminum oxide coating has a porous surface layer in which columns with an average height of 10 to 100 nm are arranged in a dispersed state, an average value of sums of cross-sectional areas of the columns in randomly sampled 400 nm square visual fields of the porous surface layer is 8000 to 128000 nm$^2$, and an average value of numbers of the columns in randomly sampled 400 nm square visual fields of the porous surface layer is 10 to 430.

In the above-described aluminum substrate comprising the aluminum oxide coating of the present invention, an average value of sums of circumferential lengths of cross-sections of the columns in randomly sampled 400 nm square visual fields of the porous surface layer is preferably 1000 to 27000 nm.

In addition, in the above-described aluminum substrate comprising the aluminum oxide coating of the present invention, the aluminum oxide coating preferably further comprises a porous intermediate layer which is formed at an aluminum substrate side of the porous surface layer and which has fine recessed portions, wherein the porous intermediate layer has an average film thickness of 500 nm to 20 µm, the fine recessed portions have an average pore diameter of 5 to 50 nm, and the fine recessed portions have an average inter-pore distance of 5 to 90 nm.

Note that, although it is not exactly clear why the above-described object can be achieved by the present invention, the present inventors speculate as follows.

Specifically, to achieve the above-described object, the present inventors have first focused attention on the bonding surface between an aluminum substrate having an aluminum oxide coating and a resin. In the conventional methods, the metal material and the resin material are bonded to each other by an ordinary anchoring effect utilizing fine pores with diameters of about 10 to 20 nm formed in an anodic oxide film. However, sufficient bonding strength cannot be obtained. Moreover, the conventional methods employ schemes to increase the bonding strength, such as deepening of the fine pores formed in the anodic oxide film or the enlargement of the pore size. However, a sufficient bonding strength cannot necessarily be obtained. In addition, enabling a resin to enter the pores of such an aluminum oxide coating requires precise setting of conditions, and also requires high pressure and the like. Accordingly, it is difficult to obtain a bonded article of a metal and a resin with a high bonding strength by a simple method.

The present inventors speculate that the metal-resin composite material in which the aluminum substrate and the resin are more firmly bonded to each other can be obtained for the following reason. Specifically, in the anodization treatment on an aluminum substrate, fine columns (protrusions, projections) on the order of several tens to several hundreds of nanometers are created above a base line of the aluminum substrate and on a bonding surface between the aluminum substrate having an aluminum oxide coating and a resin, i.e., on the surface of the aluminum oxide coating (anodic oxide film). Thus, a porous surface layer in which such columns of a specific structure are arranged in a dispersed state is formed. Consequently, a metal bonding surface having an extremely large surface area is created. When the aluminum substrate having such a metal bonding surface and a resin are bonded to each other, the fine columns of the metal bonding surface fit (bite) into the resin layer, so that the metal-resin composite material in which the aluminum substrate and the resin are more firmly bonded to each other can be obtained.

In addition, the present inventors speculate that the aluminum substrate and the resin material can be firmly bonded to each other in a simple manner for the following reason. Specifically, the contact of a resin with the aluminum substrate having the porous surface layer in which the columns of the specific structure are arranged in a dispersed state facilitates the contact (adhesion) of the surface of the aluminum substrate with the resin. Moreover, the resin in contact with the porous surface layer is entangled with the columns, and the entry of the resin into the fine pores of the aluminum oxide coating is promoted. Further, the fine columns of the metal bonding surface fit (bite) into the resin layer, so that the aluminum substrate and the resin material can be firmly bonded in a simple manner.

Advantageous Effects of Invention

According to the present invention, it is possible to provide a metal-resin composite material in which an aluminum substrate and a resin are more firmly bonded to each other, a method for producing a metal-resin composite material by which an aluminum substrate and a resin material can be firmly bonded to each other in a simple manner, and an aluminum substrate having an aluminum oxide coating excellent in adhesion to a resin.

BRIEF DESCRIPTION OF DRAWINGS

FIG. 1 Part (A) of FIG. 1 is a scanning electron microscopic (SEM) image of a longitudinal cross-section of a bonding interface between an aluminum substrate and a resin obtained in Example 2 of the present invention and is a diagram for illustrating a method for calculating an average height of a porous surface layer (an average height of columns) from an average value of distances from a boundary surface, and Part (B) of FIG. 1 is a diagram showing a normal distribution and a mathematical expression for illustrating the method for calculating the average height of the porous surface layer (the average height of columns).

FIG. 2 Part (A) of FIG. 2 is an SEM image of a porous surface layer obtained in Example 3 of the present invention, Part (B) of FIG. 2 is a diagram showing the result of a luminance threshold setting process conducted by using Part (A), Part (C) of FIG. 2 is a diagram showing the result of a particle separation process conducted by using Part (B), and Part (D) of FIG. 2 is a diagram showing the result of a binarization process.

FIG. 3 Part (A) of FIG. 3 is an SEM image of a porous surface layer obtained in Example 1 of the present invention, Part (B) of FIG. 3 is an SEM image of a longitudinal cross-section of a bonding interface between an aluminum substrate and a resin obtained in Example 1, Part (C) of FIG. 3 is a diagram showing the result of an image analysis process conducted by using Part (A), and Part (D) of FIG. 3 is a diagram showing a normal distribution used for calculating an average height of the porous surface layer.

FIG. 4 Part (A) of FIG. 4 is an SEM image of the porous surface layer obtained in Example 2 of the present invention, Part (B) of FIG. 4 is the SEM image of the longitudinal cross-section of the bonding interface between the aluminum substrate and the resin obtained in Example 2, Part (C) of FIG. 4 is a diagram showing the result of an image analysis process conducted by using Part (A), and Part (D) of FIG. 4 is a diagram showing a normal distribution used for calculating an average height of the porous surface layer.

FIG. 5 Part (A) of FIG. 5 is the SEM image of the porous surface layer obtained in Example 3 of the present invention, Part (B) of FIG. 5 is an SEM image of a longitudinal cross-section of a bonding interface between an aluminum substrate and a resin obtained in Example 3, Part (C) of FIG. 5 is a diagram showing the result of an image analysis process conducted by using Part (A), and Part (D) of FIG. 5 is a diagram showing a normal distribution used for calculating an average height of the porous surface layer.

FIG. 6 is an SEM image of a longitudinal cross-section of a porous intermediate layer obtained in Example 1 of the present invention.

FIG. 7 Part (A) of FIG. 7 is an SEM image of a longitudinal cross-section of a porous intermediate layer obtained in Example 2 of the present invention, and Part (B) of FIG. 7 is a partially enlarged photograph of Part (A) on an aluminum substrate side.

FIG. 8 Part (A) of FIG. 8 is an SEM image of a longitudinal cross-section of a porous intermediate layer obtained in Example 3 of the present invention, and Part (B) of FIG. 8 is a partially enlarged photograph of Part (A) on an aluminum substrate side.

FIG. 9 Part (A) of FIG. 9 is an SEM image of a longitudinal cross-section of an aluminum substrate and an aluminum oxide coating obtained in Comparative Example 2, Part (B) of FIG. 9 is an SEM image of a surface of the aluminum oxide coating, and Part (C) of FIG. 9 is an enlarged SEM image of the longitudinal cross-section of the aluminum oxide coating on a surface side.

DESCRIPTION OF EMBODIMENTS

Hereinafter, the present invention will be described in detail based on preferred embodiments thereof.

[Metal-Resin Composite Material]

A metal-resin composite material of the present invention comprises an aluminum substrate having an aluminum oxide coating and a resin bonded to the aluminum substrate through the aluminum oxide coating, wherein the aluminum oxide coating has a porous surface layer in which columns with an average height of 10 to 100 nm are arranged in a dispersed state, an average value of sums of cross-sectional areas of the columns in randomly sampled 400 nm square visual fields of the porous surface layer is 8000 to 128000 $nm^2$, and an average value of numbers of the columns in randomly sampled 400 nm square visual fields of the porous surface layer is 10 to 430.

(Aluminum Substrate)

The aluminum substrate according to the present invention is not particularly limited, and may be any aluminum material, as long as an aluminum oxide coating can be formed. For example, known pure aluminum or aluminum alloy is used. Specific components of the aluminum alloy are not particularly limited, and various alloys can be used, including aluminum alloys specified in Japanese Industrial Standards (JIS). For example, it is possible to use aluminum alloys of 1000 to 8000 series specified in JIS and various aluminum alloys of die-casting grade. The aluminum alloys of 1000 series are high-purity aluminum-based alloys, and the other are alloy series containing, in addition to aluminum, copper (Al—Cu alloy series, 2000 series), manganese (Al—Mn alloy series, 3000 series), silicon (Al—Si alloy series, 4000 series), magnesium (Al—Mg alloy series, 5000 series), magnesium-silicon (Al—Mg—Si alloy series, 6000 series), zinc-magnesium (Al—Zn—Mg alloy series, 7000 series), or another metal to meet various purposes (Al-another metal alloy series, 8000 series). It is possible to use not only high-purity aluminum alloys, but also various currently used aluminum alloys. The shape of such an aluminum material is not particularly limited, and it is possible to use an aluminum material processed into a desired shape by a known metal processing method such as cutting, pressing, machining, or grinding.

(Aluminum Substrate Having Aluminum Oxide Coating)

The aluminum substrate having an aluminum oxide coating of the present invention is an aluminum substrate having an aluminum oxide coating, wherein the aluminum oxide coating has a porous surface layer in which columns with an average height of 10 to 100 nm are arranged in a dispersed state, an average value of sums of cross-sectional areas of the columns in randomly sampled 400 nm square visual fields of the porous surface layer is 8000 to 128000 nm$^2$, and an average value of numbers of the columns in randomly sampled 400 nm square visual fields of the porous surface layer is 10 to 430.

Since the aluminum substrate having an aluminum oxide coating according to the present invention has the aluminum oxide coating having the porous surface layer with the above-described specific shape and structure on a surface, the aluminum substrate has excellent adhesion to a resin. This aluminum substrate having excellent adhesion to a resin is useful as a metal substrate for fabricating a metal-resin composite material.

In the aluminum substrate having the aluminum oxide coating of the present invention, the average height of the columns arranged in the surface of the aluminum substrate in a dispersed state has to be 10 to 100 nm. If the average height of the columns is below the lower limit, it is difficult to control the height, and the fitting (biting) into the resin layer is insufficient. Meanwhile, an average height of the columns exceeding the upper limit causes a problem that the process takes time, and the costs are increased. In addition, the average height of the columns is preferably 10 to 80 nm, and particularly preferably 20 to 70 nm from the viewpoints of performance and productivity.

In addition, the porous surface layer in the aluminum oxide coating of the metal-resin composite material of the present invention needs to be such that an average value of sums of cross-sectional areas of the columns in randomly sampled 400 nm square visual fields is 8000 to 128000 nm$^2$. If the average value of sums of cross-sectional areas of the columns is below the lower limit, the structure of the columns is so fine that the strength of the columns themselves is insufficient. Meanwhile, if the average value of sums of cross-sectional areas of the columns exceeds the upper limit, the spaces between side surface portions of the columns decrease, so that the sizes of the spaces for the entry of the resin and the like is insufficient. In addition, the average value of sums of cross-sectional areas of the columns in randomly sampled 400 nm square visual fields is preferably 16000 to 104000 nm$^2$, and particularly preferably 32000 to 80000 nm$^2$, from the viewpoints of securing the strength of the columns and the spaces for the entry of the resin and the like.

In addition, the porous surface layer in the aluminum oxide coating of the metal-resin composite material of the present invention needs to be such that an average value of numbers of the columns in randomly sampled 400 nm square visual fields is 10 to 430. If the average value of numbers of the columns is below the lower limit, the surface area for the fitting (biting) into the resin is insufficient. Meanwhile, if the average value of numbers of the columns exceeds the upper limit, the spaces for the entry of the resin and the like are insufficiently obtained. In addition, the average value of numbers of the columns in randomly sampled 400 nm square visual fields is preferably 50 to 350, and particularly preferably 80 to 250, from the viewpoints of securing the amount of fitting (biting) into the resin and the spaces for the entry of the resin and the like.

<Determination of Average Height of Columns in Porous Surface Layer>

The average height of the columns in the porous surface layer in the aluminum oxide coating of the present invention can be obtained as follows.

First, an image (for example, an SEM image or a transmission electron microscope (TEM) image) of a cross section of the porous surface layer of the aluminum oxide coating is obtained by taking an image of the cross-section of the porous surface layer with an SEM or a TEM. Next, the obtained SEM image or TEM image is observed to determine the average height of the columns in the porous surface layer. Specific examples of the determination method are shown below.

(1-a) The distance between an upper end of the porous surface layer of the aluminum oxide coating and the boundary surface with an intermediate layer (or the aluminum substrate, if the intermediate layer is absent) is measured in an SEM image or a TEM image of a longitudinal cross-section of the bonding interface between the aluminum substrate and the resin. Such a distance is measured for each of 30 to 100 randomly sampled cross sections. An average value of the distances is calculated, and employed as the average height of the porous surface layer (the average height of the columns).

(1-b) The maximum and the minimum are selected in the cross-sectional image, and the center between the maximum and the minimum is taken as the average value. A normal distribution is determined on the assumption that a difference between the average value and the maximum value (or the minimum value) is equal to three times the standard deviation, and the average height of the porous surface layer (the average height of the columns) and the distribution (standard deviation) thereof are evaluated.

<Determination of Cross-Sectional Areas of Columns, Circumferential Lengths of Cross-Sections of Columns, and Numbers of Columns in Porous Surface Layer>

The average value of sums of cross-sectional areas of the columns, the average value of sums of circumferential lengths of cross-sections of the columns, and the average value of numbers of the columns of the porous surface layer in the aluminum oxide coating of the present invention can be obtained as follows.

First, surface and cross-sectional images (for example, SEM images) of the porous surface layer of the aluminum oxide coating are obtained. Next, the images, which are, if necessary, subjected to noise removal or the like, are subjected to a luminance threshold setting process. For example, predetermined luminances or higher are selected in an 8 bit image. Next, the particles having luminances at or above the set threshold are selected and subjected to a separation process. The particle separation process is carried out by any known approach. Typical examples of the approach include image segmentation methods and the like. The image segmentation methods include various methods including morphology-based approaches, such as automatic threshold, edge-based approach, or Watershed transform, used for separation of contacting objects. Specifically, for example, particles are separated on the basis of the Watershed segmentation process. By this separation approach, portions at which individual particles are in contact with each other are automatically cut or divided. In specific means of the approach, first, a Euclidean distance map (EDM) is created. Subsequently, ultimate eroded points (UEPs) are found in the EDM, and each UEP (ultimate eroded point, the local maximum or peak of the EDM) is dilated as much as possible, until the UEP reaches the edge of the particle, or until the UEP reaches the edge of a region of another (growing) UEP. The above-described cross-sectional areas of the columns, circumferential lengths of cross-sections of the columns, and numbers of the columns of the porous surface layer can be calculated on the basis of the obtained results. Note that the series of the above-described analyses can be conducted with a single piece of image analysis software or a combination of multiple pieces of image analysis software and various types of analysis processing software. Specifically, it is possible to use ImageJ (image processing software developed at the National Institutes of Health) or commercially available image analysis software.

In a specific example, for example, SEM images of a surface and a cross-section of the porous surface layer of the aluminum oxide coating are taken, and the taken images are analyzed by binarization using the image analysis software ImageJ, followed by the Watershed segmentation process or the like to obtain the cross-sectional areas of the columns, the circumferential lengths of cross-sections of the columns, and the numbers of the columns of the porous surface layer.

Specifically, first, SEM images of a surface and a cross-section of the porous surface layer of the aluminum oxide coating are taken.

Next, the images from which noises have been removed are analyzed by using image analysis software ImageJ 1.47 (developed at the National Institutes of Health, obtained from http://rsbweb.nih.gov/ij/). First of all, binarization processing is conducted. In the luminance threshold setting process, a predetermined threshold is selected as a boundary visually recognizable as a first layer, and luminances at or above the predetermined threshold in the images are selected. For setting the threshold, specifically, SEM images in which the intermediate layer and the first layer (surface layer) are recognizable are converted into 8-bit images, and the luminance (for example, 130) at the end of the intermediate layer (on the opposite side from the aluminum substrate, or, if the intermediate layer is absent, the end of the aluminum substrate) is employed as the threshold.

Next, the particles having luminances at or above the set threshold are selected and a separation process of the selected particles is conducted. In this particle separation process, the particles are separated on the basis of the Watershed segmentation process. First, an EDM (Euclidean distance map) is created. Next, ultimate eroded points (UEPs) are found in the EDM, and each UEP (ultimate eroded point, a local maximum or peak in the EDM) is dilated as much as possible, until the UEP reaches the end (edge) of the particle, or until the UEP reaches a boundary (edge) of a region of another (adjacent) growing (dilating) UEP. Thus, the adjacent surface (boundary surface) is defined. Subsequently, the minimum value is determined, and blocks with sizes not smaller than the minimum value are counted. Further, the area, outer periphery, and coordinate of each block are obtained with ImageJ.

(2) The average value of sums of cross-sectional areas of the columns in randomly sampled 400 nm square visual fields of the porous surface layer: An image in a randomly sampled 400 nm square visual field is binarized, and then the areas of the counted blocks (all in the area of the SEM image) are summed up to obtain the total value of the cross-sectional areas of the columns. Five images in 400 nm square visual fields as described above are randomly sampled, and the total value of the cross-sectional areas of the columns in each image is determined. Then, the five total values are averaged, and employed as the above-described average value of sums of cross-sectional areas of the columns in randomly sampled 400 nm square visual fields.

(3) The average value of sums of circumferential lengths of cross-sections of the columns in randomly sampled 400 nm square visual fields of the porous surface layer: An image in a randomly sampled 400 nm square visual field is binarized, and then the outer peripheries of counted blocks are summed up (all in the area of the SEM image) to obtain the total value of the circumferential lengths of cross-sections of the columns. Five images in 400 nm square visual fields as described above are randomly sampled, and the total value of the circumferential lengths of cross-sections of the columns in each image is determined. Then, the five total values are averaged, and employed as the above-described average value of sums of circumferential lengths of cross-sections of the columns in randomly sampled 400 nm square visual fields.

(4) The average value of numbers of the columns in randomly sampled 400 nm square visual fields of the porous surface layer: An image in a randomly sampled 400 nm square visual field is binarized, and then the total number of blocks which have been divided by the Watershed segmentation process is obtained. Five images in 400 nm square visual fields as described above are randomly sampled, and the total number of the blocks in each image is determined. Then, the five total numbers are averaged, and employed as the above-described average value of numbers of the columns in randomly sampled 400 nm square visual fields.

(Preferred Mode of Aluminum Substrate Having Aluminum Oxide Coating)

A preferred aluminum substrate having an aluminum oxide coating in the present invention is an aluminum substrate having an aluminum oxide coating, wherein the aluminum oxide coating has a porous surface layer in which columns with an average height of 10 to 100 nm are arranged in a dispersed state, an average value of sums of cross-sectional areas of the columns in randomly sampled 400 nm square visual fields of the porous surface layer is 8000 to 128000 $nm^2$, an average value of numbers of the columns in randomly sampled 400 nm square visual fields of the porous surface layer is 10 to 430, and an average value of sums of circumferential lengths of cross-sections of the columns in randomly sampled 400 nm square visual fields of the porous surface layer is 1000 to 27000 nm.

The preferred aluminum substrate having an aluminum oxide coating according to the present invention has the aluminum oxide coating having the preferred porous surface layer with the above-described specific shape and structure on a surface. Hence, the preferred aluminum substrate is better in adhesion to a resin. This aluminum substrate very good at adhesion to a resin is extremely useful as a metal substrate for fabricating a metal-resin composite material.

In the preferred aluminum substrate having the aluminum oxide coating of the present invention, the porous surface layer is preferably such that an average value of sums of circumferential lengths of cross-sections of the columns in randomly sampled 400 nm square visual fields is 1000 to 27000 nm. If the average value of sums of circumferential lengths of cross-sections of the columns is below the lower limit, the structure of the columns is so fine that the strength of the structure of the columns tends to be insufficient. Meanwhile, if the average value of sums of circumferential lengths of cross-sections of the columns exceeds the upper limit, the sizes of the spaces for the fitting (biting) of the resin and the like between the columns tend to be insufficient. In addition, the average value of sums of circumferential lengths of cross-sections of the columns in randomly sampled 400 nm square visual fields is more preferably 3000 to 23000 nm, and particularly preferably 5000 to 20000 nm, from the viewpoint of securing the strength of the structure of the columns and the spaces for the fitting between the columns.

(Another Preferred Mode of Aluminum Substrate Having Aluminum Oxide Coating)

The aluminum substrate having an aluminum oxide coating of the present invention preferably has an aluminum oxide coating on a surface of the aluminum substrate, the aluminum oxide coating having the above-described porous surface layer in which columns with an average height of 10 to 100 nm are arranged in a dispersed state and a porous intermediate layer which is formed at an aluminum substrate side of the porous surface layer and which has fine recessed portions, wherein the porous intermediate layer has an average film thickness of 500 nm to 20 μm, the fine recessed portions have an average pore diameter of 5 to 50 nm, and the fine recessed portions have an average inter-pore distance of 5 to 90 nm.

The preferred aluminum substrate having an aluminum oxide coating according to the present invention has the aluminum oxide coating having the porous surface layer with the above-described specific shape and structure and the porous intermediate layer with the above-described specific shape and structure on the surface. Hence, the preferred aluminum substrate has more advanced adhesion to a resin. This aluminum substrate very good at adhesion to a resin is extremely useful as a metal substrate for fabricating a metal-resin composite material.

In the aluminum substrate having the aluminum oxide coating of the present invention, the average film thickness of the porous intermediate layer is preferably 500 nm to 20 μm, more preferably 500 nm to 15 μm, and particularly preferably 500 nm to 10 μm. If the average film thickness of the porous intermediate layer is less than the lower limit, it tends to be difficult to obtain a homogeneous porous intermediate layer. Meanwhile, if the average film thickness exceeds the upper limit, the process takes time, so that the costs tend to increase.

In addition, in the porous intermediate layer of the aluminum substrate having the aluminum oxide coating of the present invention, the average pore diameter of the fine recessed portions is preferably 5 to 50 nm, more preferably 5 to 30 nm, and particularly preferably 10 to 20 nm. If the average pore diameter of the fine recessed portions is less than the lower limit, it tends to be difficult to obtain the anchoring effect owing to the entering of the resin and the like. Meanwhile, if average pore diameter of the fine recessed portions exceeds the upper limit, the homogeneity of the porous intermediate layer tends to decrease.

In addition, in the porous intermediate layer of the aluminum substrate having the aluminum oxide coating of the present invention, the average inter-pore distance of the fine recessed portions is preferably 5 to 90 nm, more preferably 10 to 70 nm, and particularly preferably 20 to 50 nm. If the average inter-pore distance of the fine recessed portions is less than the lower limit, it tends to be difficult to obtain homogeneous wall faces forming the pores of the recessed portions. Meanwhile, if the average inter-pore distance of the fine recessed portions exceeds the upper limit, the amount of the fitting (biting) of the resin tends to decrease, because the number of pores per unit area decreases.

In addition, the shape of the fine recessed portions formed in the porous intermediate layer is not particularly limited, and, for example, may be any shape such as a shape in which the fine recessed portions have such an orientation that the fine recessed portion grow in a direction perpendicular to the surface of the aluminum substrate or in a direction inclined at a certain angle with respect to the surface of the aluminum substrate, a shape in which the fine recessed portions grow random directions with respect to the surface of the aluminum substrate and have no orientation (for example, an ant nest-like structure, a three-dimensional network structure in which the recessed portion pores are entangled with each other in a three-dimensional network shape, a random shaped structure, or the like), or a shape in which the fine recessed portions are straight and have no orientation. The fine recessed portions may have any shape, as long as the performances of the porous intermediate layer necessary for achieving the intended performances (strength and the like) of the metal-resin composite material can be satisfied.

In addition, the porous intermediate layer in the aluminum substrate having the aluminum oxide coating of the present invention can be formed of multiple layers.

<Measurement of Average Film Thickness of Porous Intermediate Layer, Average Pore Diameter of Fine Recessed Portions, and Average Inter-Pore Distance>

In the aluminum oxide coating of the present invention, the average film thickness of the porous intermediate layer, the average pore diameter of the fine recessed portions, and the average inter-pore distance of the fine recessed portions are measured by TEM (transmission electron microscopic) observation, SEM (scanning electron microscopic) observation, or the like of cross sections of the porous intermediate layer.

In a specific example, for example, the average film thickness, the average pore diameter, and the average inter-pore distance of the porous intermediate layer of the aluminum oxide coating are measured by preparing a thin sample by a conventional method (for example, using an ultramicrotome) and then subjecting the thin sample to cross-sectional SEM observation. In addition, each measurement value is measured as the average value in the corresponding observed visual field.

(5) The average film thickness of the porous intermediate layer: Longitudinal cross-sections of the bonding interface between the aluminum substrate and the resin are subjected to SEM observation (for example, 20000 times magnification). The distance between the upper end of the intermediate layer of the aluminum oxide coating and the boundary surface with the aluminum substrate is measured in each of the SEM images. The average value of the distances for five or more randomly sampled cross-sections is calculated, and employed as the average film thickness of the intermediate layer.

(6) The average pore diameter of fine recessed portions of the porous intermediate layer: A randomly sampled surface portion or a randomly sampled transverse cross-section of the porous intermediate layer of the aluminum oxide coating is subjected to SEM observation (for example, 20000 times magnification). Five or more pores are randomly sampled from the SEM image, and the distance between the most distant two points in each pore is employed as the pore diameter, and the average value of five or more pore diameters is obtained.

(7) The average inter-pore distance of the fine recessed portions of the porous intermediate layer: A randomly sampled surface portion or a randomly sampled transverse cross-section of the porous intermediate layer of the aluminum oxide coating is subjected to a SEM observation (for example, 20000 times magnification). Five or more pores are randomly sampled from the SEM image. The distance between the centers of each pore and the nearest pore to the pore is employed as the inter-pore distance, and the average value of five or more inter-pore distances is obtained.

(Resin)

The resin in the metal-resin composite material of the present invention is not particularly limited, and any resin can be used. For example, the resin is preferably a resin usable for ordinary resin molding such as injection molding or hot pressing. Specific examples of the resin include thermoplastic resins such as commodity plastics, commodity engineering plastics, and super engineering plastics, as well as thermosetting resins. From these reins, the resin can be selected, as appropriate, according to various applications. One of these thermoplastic resins and thermosetting resins may be used alone or two or more thereof may be used in combination.

The commodity plastics include aromatic vinyl resins such as polystyrene, acrylonitrile-butadiene-styrene copolymer (ABS resin), acrylonitrile-styrene copolymer (AS resin), methyl methacrylate-acrylonitrile-styrene copolymer (MAS resin), methyl methacrylate-acrylonitrile-butadiene-styrene copolymer (MABS resin), and styrene-butadiene-styrene copolymer (SBS resin); acrylic resins such as polymethyl methacrylate, polymethyl acrylate, polymethacrylic acid, copolymers thereof, and acrylic rubbers; vinyl cyanide-based resins such as polyacrylonitrile, acrylonitrile-methyl acrylate copolymer, and acrylonitrile-butadiene copolymer; polyolefin-based resins such as polyethylene, polypropylene, polyisoprene, polybutadiene, ethylene-propylene-diene monomer rubber, and ethylene-propylene rubber; polyvinyl chloride-based resins such as polyvinyl chloride and polyvinylidene chloride; polyvinyl alcohol; polyethylene terephthalate; and the like.

The commodity engineering plastics include polyamides such as nylon 6, nylon 66, and nylon 12; polyacetal (polyoxymethylene); polycarbonate; modified polyphenylene ether; polybutylene terephthalate; ultra-high-molecular-weight polyethylene; and the like.

The super engineering plastics include polysulfones; polyether sulfones; polyarylene sulfides such as polyphenylene sulfide; polyarylates; amorphous polyarylates; thermoplastic polyamideimides; polyetherimides; polyetheretherketones; thermoplastic polyimides; liquid crystal polymers such as liquid crystal polyesters; fluororesins such as polytetrafluoroethylene, fluorinated ethylene propylene, polychlorotrifluoroethylene, polyvinylidene fluoride, and polyvinyl fluoride; and the like.

Moreover, other thermoplastic resins include high impact polystyrene (HIPS), acid- or acid anhydride-modified polyolefin-based resins, epoxy-modified polyolefin resins, cyclic polyolefins, acid- or acid anhydride-modified acrylic elastomers, epoxy-modified acrylic elastomers, silicone rubbers, fluororubbers, natural rubber, imide group-containing vinyl resins, poly(1,4-cyclohexanedimethyl terephthalate), polylactic acid, polyetherketone, polyether amide, and the like.

The thermosetting resins are not particularly limited, and include epoxy resins, phenolic resins, melamine resins, thermosetting polyimide resins, thermosetting polyamideimides, thermosetting silicone resins, urea resins, unsaturated polyester resins, urea resins, benzoguanamine resins, alkyd resins, urethane resins, and the like.

(Metal-Resin Composite Material)

The metal-resin composite material of the present invention comprises the aluminum substrate having the aluminum oxide coating and the resin bonded to the aluminum substrate through the aluminum oxide coating.

Note that, in the metal-resin composite material of the present invention, it is only necessary that the aluminum substrate and the resin be bonded to each other through the aluminum oxide coating. The metal-resin composite material may have a multilayer structure in which another layer (for example, another resin layer, an inorganic layer, or the like) is stacked on each of the aluminum substrate and the resin. The constitution of the other layers is not particularly limited, and the design can be modified, as appropriate, according to the application of the metal-resin composite material and the like.

In addition, the resin in the metal-resin composite material of the present invention can be blended with various additives, unless an effect of the present invention is impaired. The blending of additives brings about effects such as improvement in elastic modulus of the resin (an effect of an inorganic filler such as carbon fiber or glass fiber), polarity change (an effect of rubber, elastomer, or other resin), and inhibition of degradation and deceleration of decomposition reaction (effects of antioxidant or the like), so that further improvement in bonding strength, improvement in wettability of the resin-metal interface, further improvement in interface adhesion, improvement in long-term stability (heat resistance, moist heat resistance, water resistance, etc.), and the like can be expected.

The additives are not particularly limited, and examples thereof include flame retardant, antioxidant, ultraviolet absorber, hydrolysis inhibitor, light stabilizer, ultraviolet absorber, antistat, lubricant, mold release agent, nucleating agent, rheology controlling agent, coloring agent, dye, antibacterial agent, surface treatment agents such as silane coupling agent, carbon-based nanofillers such as graphite, carbon nanofiber, carbon nanotube, carbon nanoplatelet, graphene, few-layer graphene, nano graphite (such as graphene nanoribbon), nano graphene, carbon nanohorn, carbon nanocone, carbon nanocoil, and fullerene, fibrous substances including glass fiber, carbon fiber, synthetic fibers such as aramid fiber, and natural fibers such as cellulose, chitin, and chitosan, layered silicates such as mica mineral and kaolin mineral, inorganic fillers such a calcium carbonate, calcium phosphate, titanium oxide, silica, whisker, alumina, boron nitride, aluminum nitride, silicon nitride, silicon carbide, diamond, and zinc oxide, and the like. Note, however, that care should be taken because addition of these additives in a large quantity may cause deterioration in impact strength. It is also possible to add organic additives such as rubber, elastomer, flexible resin component and/or plasticizer. Note, however, that care should be taken because addition of the organic additives in a large quantity may cause decrease in high-temperature rigidity and lowering of the deflection temperature under load.

The types of these additives are not particularly limited, and the additives are each preferably a component whose compatibility with the resin is not extremely low, or a component whose compatibility with the resin is low but can be improved by chemical modification or addition of a compatibilizer. Here, one of these additives may be used alone, or two or more thereof may be used in combination.

In addition, a method for blending such an additive is not particularly limited, as long as the additive can be dispersed in the resin by the method. For example, it is possible to employ a conventionally known method such as a method in which the resin and additive are mixed in a solvent, a method in which the resin and the additive are melt kneaded by using a single-screw or multi-screw vent-type extruder, a rubber roll mill, a Banbury mixer, or the like. When a low-viscosity thermosetting resin is used as the resin, it is also possible to mix the additive and the resin by conducting a complexing treatment using a planetary centrifugal mixer.

[Method for Producing Metal-Resin Composite Material]

A method for producing a metal-resin composite material of the present invention is a method for producing a metal-resin composite material comprising an aluminum substrate having an aluminum oxide coating and a resin bonded to the aluminum substrate through the aluminum oxide coating, the method comprising:

a surface treatment step of subjecting an aluminum substrate to an anodization treatment to form, on a surface of the aluminum substrate, an aluminum oxide coating having a porous surface layer in which columns with an average height of 10 to 100 nm are arranged in a dispersed state, an average value of sums of cross-sectional areas of the columns in randomly sampled 400 nm square visual fields being 8000 to 128000 $nm^2$, an average value of sums of circumferential lengths of cross-sections of the columns in randomly sampled 400 nm square visual fields being 1000 to 27000 nm, and an average value of numbers of the columns in randomly sampled 400 nm square visual fields being 10 to 430; and a bonding step of bonding the aluminum substrate to a resin through the aluminum oxide coating having the porous surface layer and formed in the surface treatment step.

In addition, in the surface treatment step of the above-described method for producing a metal-resin composite material of the present invention, it is preferable to form, on the surface of the aluminum substrate, an aluminum oxide coating having a porous surface layer in which columns with an average height of 10 to 100 nm are arranged in a dispersed state by subjecting the aluminum substrate to the anodization treatment, wherein the porous surface layer has an average thickness of 10 to 100 nm, an average value of sums of cross-sectional areas of the columns in randomly sampled 400 nm square visual fields is 8000 to 128000 $nm^2$, an average value of numbers of the columns in randomly sampled 400 nm square visual fields is 10 to 430, and an average value of sums of circumferential lengths of cross-sections of the columns in randomly sampled 400 nm square visual fields is 1000 to 27000 nm.

Moreover, in the surface treatment step of the above-described method for producing a metal-resin composite material of the present invention, it is preferable to form, on the surface of the aluminum substrate, an aluminum oxide coating having the above-described porous surface layer and a porous intermediate layer which is formed at an aluminum substrate side of the porous surface layer and which has fine recessed portions, wherein the porous intermediate layer has an average film thickness of 500 nm to 20 μm, the fine recessed portions have an average pore diameter of 5 to 50 nm, and the fine recessed portions have an average inter-pore distance of 5 to 90 nm.

(Preferred Embodiment of Method for Producing Metal-Resin Composite Material)

A preferred embodiment of the method for producing a metal-resin composite material of the present invention is a method for producing a metal-resin composite material comprising an aluminum substrate having an aluminum oxide coating and a resin bonded to the aluminum substrate through the aluminum oxide coating, the method comprising:

a surface treatment step of subjecting an aluminum substrate to an anodization treatment conducted at multiple stages to form an aluminum oxide coating having the above-described porous surface layer on a surface of the aluminum substrate, thereby obtaining the above-described aluminum substrate having the aluminum oxide coating of the present invention; and a bonding step of bonding the aluminum substrate to a resin through the aluminum oxide coating of the aluminum substrate having the aluminum oxide coating obtained in the surface treatment step.

(Surface Treatment Step)

In the surface treatment step of the preferred embodiment of the method for producing a metal-resin composite material according to the present invention, the anodization treatment conducted at multiple stages (a multiple-stage treatment of the anodization treatment) is not particularly limited, and a known anodization method can be employed, as appropriate. For example, the surface of the aluminum substrate is anodized at multiple stages by conducting electrolysis in an acidic solution by using the aluminum substrate as an anode and an insoluble electrode as a cathode, so that the aluminum oxide coating (anodic oxide coating) which is made of aluminum oxide and which has the above-described porous surface layer and porous intermediate layer can be formed.

The electrolytic method, the cathode, the electrolytic solution, the concentration and temperature of the electrolytic solution, the current density and voltage for the electrolysis, the time of the electrolytic treatment, and the like employed in the anodization treatment are not particularly limited, and it is possible to select, as appropriate, a method and conditions for the anodization treatment by and under which the desired shape, structure, and the like of the aluminum oxide coating, i.e., the desired shape, structure, and the like of the porous surface layer and the desired shape, structure, and the like of the porous intermediate layer can be formed.

The anodization treatment used in the surface treatment step according to the present invention is not particularly limited, and a known anodization method can be employed, as appropriate. For example, a surface of the aluminum substrate is anodized by electrolysis in an acidic solution using the aluminum substrate as the anode and an insoluble electrode as the cathode. Thus, an aluminum oxide coating (anodic oxide coating) which is made of aluminum oxide and which has the above-described porous surface layer can be formed.

In addition, the electrolytic method used in the anodization treatment is not particularly limited, and, for example, it is possible to employ an electrolytic method such as a cyclic method, a constant-current method, a constant-potential method, a constant-potential pulse method, a constant-current pulse method, and the like.

In addition, the cathode used in the anodization treatment is not particularly limited, and any cathode can be used, unless the cathode reacts with the acidic solution, or has remarkably low electrical conductivity, for example. In general, it is possible to use an insoluble electric conductor plate of platinum, lead, stainless steel, carbon, or the like.

The electrolytic solution used in the anodization treatment is not particularly limited, and examples thereof include acidic solutions such as phosphoric acid, chromic acid, oxalic acid, and sulfuric acid solutions. One or a mixture of two or more of these acidic solutions can be used.

In addition, the concentration of the acidic solution can be selected, as appropriate, according to other conditions such as the type of the electrolytic solution used and the shape and structure of the porous surface layer and/or the porous intermediate layer formed. For example, when an aqueous sulfuric acid solution is used as the acidic solution, the concentration is more preferably 0.01 to 10 mol/L. When an aqueous oxalic acid solution is used, the concentration is more preferably 0.01 to 10 mol/L. Meanwhile, the temperature of the acidic solution is preferably −10 to 80° C. and more preferably −10 to 60° C. By conducting the anodization treatment at the temperature, the porous surface layer and/or the porous intermediate layer can be formed easily on the surface of the aluminum substrate. Accordingly, this facilitates the contact (adhesion) of the surface of the aluminum substrate with the resin. In addition, the resin in contact with the porous surface layer is entangled with the columns, and the entry of the resin into the fine pores in the aluminum oxide coating is promoted, so that the fine columns of the metal bonding surface further fit (bite) into the resin layer. This makes it possible to firmly bond the aluminum substrate to the resin material in a simple manner. If the temperature of the acidic solution is lower than the lower limit, it tends to be difficult to form the columns of the porous surface layer and/or the porous intermediate layer according to the present invention. Meanwhile, if the temperature of the acidic solution exceeds the upper limit, the dissolution of the anodic oxide coating is accelerated, so that it tends to be difficult to form the columns and/or the porous intermediate layer.

In addition, the electrolytic current density employed in the anodization treatment is not particularly limited, and is, for example, preferably 0.002 to 2.5 $A/dm^2$ and more preferably 0.002 to 1.0 $A/dm^2$. If the electrolytic current density is lower than the lower limit, the formation speed of the porous surface layer and/or the porous intermediate layer tends to be extremely low. Meanwhile, if the electrolytic current density exceeds the upper limit, the dissolution of the anodic oxide coating is accelerated, so that it tends to be difficult to form the columns. Note that the time of the electrolytic treatment in the anodization treatment is preferably 30 seconds to 100 minutes.

A preferred specific example of the multiple-stage treatment of the anodization treatment is as follows. Specifically, in a first-stage anodization treatment, electrolysis is conducted by using an aluminum substrate as the anode, a platinum plate as the cathode, and an acidic solution containing one or two or more acidic solutions of phosphoric acid, chromic acid, oxalic acid, sulfuric acid solutions and the like as the electrolytic liquid under conditions of a concentration of the acidic solution of 0.01 to 10 mol/L, a treatment temperature of −10 to 60° C., a current density of 0.002 to 1.0 $A/dm^2$, a voltage of 1.0 to 30 V, and a treatment time of 30 seconds to 100 minutes. Thus, an anodic oxide film is formed on the surface of the aluminum substrate.

Note that more preferred conditions of the first-stage anodization treatment are as follows. An acidic solution of one or both of oxalic acid and sulfuric acid is used as the electrolytic liquid, the concentration of the acidic solution is 0.01 to 1 mol/L, the treatment temperature is −10 to 30° C., the current density is 0.002 to 0.5 $A/dm^2$, the voltage is 1.0 to 10 V, and the treatment time is 30 seconds to 30 minutes.

In a subsequent anodization treatment, electrolysis is conducted by using the aluminum substrate as the anode, a platinum plate as the cathode, and an acidic solution containing one or two or more of phosphoric acid, chromic acid, oxalic acid, sulfuric acid, and the like as the electrolytic liquid under conditions of a concentration of the acidic solution of 0.01 to 10 mol/L, a treatment temperature of −10 to 60° C., a current density of 0.002 to 1.0 $A/dm^2$, a voltage of 1.0 to 30 V, and a treatment time of 30 seconds to 100 minutes. Thus, an anodic oxide film comprising multiple layers is formed on the surface of the aluminum substrate.

Note that more preferred conditions of the anodization treatment at a second stage or later are as follows. An acidic solution of one or both of oxalic acid and sulfuric acid is used as the electrolytic liquid, the concentration of the acidic solution is 0.01 to 1 mol/L, the treatment temperature is −10 to 30° C., the current density is 0.002 to 0.5 $A/dm^2$, the voltage is 1.0 to 20 V, and the treatment time is 30 seconds to 60 minutes.

In the multiple-stage treatment of the anodization treatment, it is more preferable to employ treatment conditions under which (the thickness of the layer formed by the first-stage treatment) ≤(the thickness of the layers formed at the second-stage treatment and later). This makes it possible to easily form the above-described columns in the porous surface layer of the present invention.

Here, the current density in the present invention refers to a value obtained by dividing an electric current value set by a regulated DC power supply (Product Number: AD-8735d manufactured by AND) by the surface area of the aluminum metal member.

As described above, the preferred embodiment of the method for producing a metal-resin composite material of the present invention makes it possible to form, on a surface of an aluminum substrate, an aluminum oxide coating having a porous surface layer (first layer) in which columns with an average height of 10 to 100 nm are arranged in a dispersed state, wherein the porous surface layer has an average thickness of 10 to 100 nm, an average value of sums of cross-sectional areas of the columns in randomly sampled 400 nm square visual fields is 8000 to 128000 $nm^2$, and an average value of numbers of the columns in randomly sampled 400 nm square visual fields is 10 to 430. Thus, the aluminum substrate having the aluminum oxide coating (the aluminum substrate having the above-described first layer) of the present invention can be obtained.

In addition, the preferred embodiment of the method for producing a metal-resin composite material of the present invention makes it possible to form, on a surface of an aluminum substrate, an aluminum oxide coating having a porous surface layer (a preferred first layer) in which columns with an average height of 10 to 100 nm are arranged in a dispersed state, wherein the porous surface layer has an average thickness of 10 to 100 nm, an average value of sums of cross-sectional areas of the columns in randomly sampled 400 nm square visual fields is 8000 to 128000 $nm^2$, an average value of numbers of the columns in randomly sampled 400 nm square visual fields is 10 to 430, and an average value of sums of circumferential lengths of cross-sections of the columns in randomly sampled 400 nm square visual fields is 1000 to 27000 nm. Thus, an aluminum substrate having the aluminum oxide coating of the present invention (an aluminum substrate having the above-described preferred first layer) can be obtained.

Further, the preferred embodiment of the method for producing a metal-resin composite material of the present invention makes it possible to form, on a surface of an aluminum substrate, an aluminum oxide coating having the above-described porous surface layer and a porous intermediate layer (a second layer) which is formed at an aluminum substrate side of the porous surface layer and which has fine recessed portions, wherein the porous intermediate layer has an average film thickness of 500 nm to 20 μm, the fine recessed portions have an average pore diameter of 5 to 50 nm, and the fine recessed portions have an average interpore distance of 5 to 90 nm. Thus, an aluminum substrate having the second layer can be obtained.

Note that, in the anodization treatment of the present invention, it is possible to conduct, as appropriate, ordinarily employed preliminary treatments (buffing, hairline finish, satin finish, patterning, and the like) and ordinarily employed pretreatments (surface cleaning and dissolving treatments such as degreasing, etching, desmutting, and electrolytic polishing) before the anodization treatment. Moreover, in the anodization treatment of the present invention, it is possible to conduct, as appropriate, ordinarily employed posttreatments (washing with water, pore sealing, and the like), after the anodization treatment.

In the anodization treatment of the present invention, the surface to be subjected to the surface treatment is preferably subjected to any one or two or more of a degreasing treatment, an etching treatment, a desmuting treatment, and an electrolytic polishing treatment as the pretreatments conducted before the anodization treatment.

The degreasing treatment conducted before the anodization treatment can be conducted by using, for example, an ordinary degreasing bath containing sodium hydroxide, sodium carbonate, sodium phosphate, a surfactant, or the like. The treatment conditions are that the immersion temperature is preferably 15 to 55° C. and more preferably 25 to 40° C., and the immersion time is preferably 1 to 10 minutes and more preferably 3 to 6 minutes.

Meanwhile, in the etching treatment conducted before the anodization treatment, for example, an aqueous alkali solution or the like of sodium hydroxide (NaOH), potassium hydroxide (KOH), sodium carbonate ($Na_2CO_3$), or the like is used. The treatment conditions are that the concentration of the aqueous alkali solution is 20 to 200 g/L and preferably 50 to 150 g/L, the immersion temperature is preferably 30 to 70° C. and more preferably 40 to 60° C., and the immersion time is preferably 0.5 to 5 minutes and more preferably 1 to 3 minutes. An acidic etching treatment may also be conducted by using an aqueous acid solution of hydrochloric acid, nitric acid, sulfuric acid, hydrofluoric acid or the like. In the acidic etching treatment, the concentration of the aqueous acid solution is 20 to 200 g/L, the immersion temperature is preferably 30 to 70° C. and more preferably 40 to 60° C., and the immersion time is preferably 0.5 to 5 minutes and more preferably 1 to 3 minutes.

In addition, in the desmuting treatment conducted before the anodization treatment, for example, an aqueous solution of nitric acid, sulfuric acid or the like is used. The treatment conditions are that the immersion temperature is preferably 15 to 55° C. and more preferably 25 to 40° C., and that the immersion time is preferably 1 to 10 minutes and more preferably 3 to 6 minutes.

In addition, in the electrolytic polishing treatment conducted before the anodization treatment, for example, an aqueous solution of phosphoric acid, phosphoric acid-sulfuric acid, phosphoric acid-sulfuric acid-chromic acid, perchloric acid-acetic anhydride, perchloric acid-ethanol, nitric acid or the like is used. The treatment conditions are that the current density is preferably 1 to 10 $A/dm^2$, the bath voltage is preferably 20 to 30 V, and the treatment time is preferably 1 to 5 minutes.

In addition, for the anodization treatment of the present invention, the water washing step generally conducted after the anodization treatment is, for example, preferably washing of the aluminum substrate in which the anodic oxide coating has been formed with water at a temperature of 5 to 60° C., and more preferably with water at 10 to 50° C. A specific example is that the aluminum substrate is washed with tap water at normal temperature multiple times, and then washed with water at about 50° C. for about 30 seconds.

Note that, as a posttreatment of the anodization treatment of the present invention, it is preferable that the aluminum oxide coating on the surface of the aluminum substrate be treated with a phosphoric acid solution.

(Bonding Step)

In the bonding step of the method for producing a metal-resin composite material of the present invention, a method for bonding the aluminum substrate and the resin to each other is not particularly limited, and a known method for molding a resin can be employed, as appropriate. In the present invention, any method can be employed, as long as the aluminum substrate and the resin can be bonded to each other through the aluminum oxide coating having the above-described porous surface layer and formed in the surface treatment step. For example, it is possible to use a method such as an injection molding method, a compression molding method, a melt compression bonding method, or a pressing method.

Specifically, an injection molding method is preferably used. The injection molding method is not particularly limited, and an ordinary injection molding method using an injection molding machine can be used.

The injection molding method employed in the bonding step according to the present invention is not particularly limited, and a known injection molding method can be employed, as appropriate. Specifically, first, the aluminum substrate having the aluminum oxide coating obtained in the surface treatment step is set to a predetermined mold for injection molding. Next, a resin in a molten state is injected to a surface of a portion including the porous surface layer of the aluminum oxide coating of the aluminum substrate having the aluminum oxide coating. After that, the resin is solidified by cooling the mold, so that the aluminum substrate and the resin are bonded to each other. The resin temperature during the injection is not particularly limited, as long as the resin temperature is at or above a temperature at which the resin forming the bonding surface can flow. Moreover, as other injection conditions, known conditions suitable for each resin can be employed.

In addition, another specific example of the injection molding method is as follows. Specifically, first, a mold for injection molding is prepared. The mold is opened, and the aluminum substrate having the aluminum oxide coating obtained in the surface treatment step is inserted into one of the pieces of the mold as an insert member, and the mold is closed. Next, a thermoplastic resin melted under high temperature and high pressure is injected and insertion-molded. Then, the mold is opened, and the article is released from the mold. Thus, the thermoplastic resin is bonded to the aluminum substrate to produce the metal-resin composite material. Note that conditions such as molding pressure and injection speed can be set, as appropriate, according to the molding machine used, the type of the resin, and the shape to be formed.

The melt compression bonding method employed in the bonding step according to the present invention is not particularly limited, and a known melt compression bonding method can be employed, as appropriate. Specifically, first, a resin is preliminary molded into a predetermined shape by a known molding method such as injection molding or extrusion molding. The preliminary molded resin material is staked on a desired portion including the porous surface layer of the aluminum oxide coating of the aluminum substrate having the aluminum oxide coating obtained in the surface treatment step to produce a metal-resin composite material precursor. After that, the metal-resin composite material precursor is press molded with heating. Thus, the resin is melt compression bonded to the aluminum substrate having the aluminum oxide coating. By cooling the obtained press molded article, the metal-resin composite material of the present invention in which the aluminum substrate having the aluminum oxide coating and the resin are bonded to each other can be obtained. The heating temperature during the melt compression bonding is not particularly limited, as long as the heating temperature is at or above a temperature at which the resin forming the bonding surface can flow. Regarding other conditions of the melt compression bonding, known conditions suitable for each resin can be employed.

The pressing method employed in the bonding step according to the present invention is not particularly limited, and a known method based on pressing can be employed, as appropriate. Specifically, the resin is placed on a region, at which the resin is to be bonded, of the aluminum substrate having the aluminum oxide coating obtained in the surface treatment step and then pressed. When such a pressing method is employed, a pressure (press) condition is not particularly limited, and is preferably 10 to 3000 kPa and more preferably 100 to 1000 kPa. If the pressure condition is lower than the lower limit, it is difficult to form a firmly adhered layer by the resin and the porous surface layer of the aluminum oxide coating of the aluminum substrate, so that it tends to be impossible to impart a sufficiently high bonding strength. Meanwhile, if the pressure condition exceeds the upper limit, the resin is excessively spread, and the firmly adhered layer cannot be obtained, so that it tends to be impossible to impart a sufficiently high bonding strength. Note that since it is not necessary to conduct pressing at a high pressure in the pressing method, the pressing method can be employed as a simple method.

EXAMPLES

Hereinafter, the present invention will be described more specifically on the basis of Examples and Comparative Examples. However, the present invention is not limited to Examples below.

Examples 1 to 3

An aluminum sample (JIS A1050, 10 mm×50 mm×t1 mm) was prepared. Next, the aluminum sample was subjected to a degreasing treatment with acetone, and then an electrolytic polishing treatment was conducted on the surface of the aluminum sample for 2 minutes by using a mixture liquid of $HClO_4$ (67 ml) and $C_2H_5OH$ (160 ml) as an electrolytic polishing liquid under conditions of a temperature of 15 to 30° C. and a voltage of 8 V. Then, the aluminum sample was washed with ion-exchanged water.

Next, the aluminum sample subjected to the electrolytic polishing treatment was subjected to an anodization treatment by using an aqueous solution of 5 to 50% by weight of sulfuric acid (manufactured by Wako Pure Chemical Industries, Ltd., purity: 96 to 98%) as the electrolytic liquid, the aluminum sample as the anode, and a platinum plate, which was an insoluble electrode, as the cathode under the conditions shown in Table 1. Thus, an aluminum oxide coating was formed on the aluminum sample surface, and then the aluminum sample was washed with water and dried.

Subsequently, the anodized aluminum test piece was immersed in a phosphoric acid solution. After stirring at room temperature for 5 minutes, the anodized aluminum test piece was washed with water. Further, the same treatment was conducted.

Next, a resin was injection molded on the surface of the aluminum sample, on which the aluminum oxide coating was formed, by using an injection molding apparatus.

Specifically, first, the aluminum sample on which the aluminum oxide coating was formed was set in a mold for injection molding. This mold was mounted on an injection molding apparatus (C. Mobile, a small injection molding apparatus manufactured by SHINKO SELLBIC CO., LTD.), and polyphenylene sulfide (a PPS resin "TORELINA" manufactured by Toray Industries, Inc., unreinforced, standard, A900, melting point: 278° C., hereinafter abbreviated as "PPS") was injected on the surface of the aluminum plate on which the aluminum oxide coating was formed under conditions of a resin temperature of 330° C., a mold temperature of 120 to 150° C., and a holding time of 30 seconds. Thus, an injection molded article in which the aluminum sample (10 mm×50 mm×t1 mm) and the resin (10 mm×40 mm×t2 mm) were bonded to each other (overlapping portion: 10 mm×10 mm) was fabricated.

<Evaluation Test: Tensile Shear Test>

The obtained injection molded articles (Examples 1 to 3) were used as test pieces. Each of the test pieces was each subjected to a tensile shear test (n=3) by using an Instron universal testing machine ("INSTRON 5566" manufactured by Instron) equipped with a vise-type chuck under conditions of a tensile speed of 10 mm/minute, a chuck distance of 50 mm, and a load cell of 10 kN to measure the tensile strength. Table 2 shows the obtained results.

<Observation of Porous Surface Layer>

By SEM observation of the aluminum oxide coating before the injection molding obtained in Examples 1 to 3, the average height of the porous surface layer (the average height of the columns), the average value of sums of cross-sectional areas of the columns, the average value of sums of circumferential lengths of cross-sections of the columns, and the average value of numbers of the columns were determined.

First, the average height of the porous surface layer (the average height of the columns) of the aluminum oxide coating was determined by using an SEM. At the beginning, SEM images of the surface of the porous surface layer of the aluminum oxide coating and a longitudinal cross-section of the bonding interface between the aluminum substrate and the resin were taken. Subsequently, the distance between the upper end of the porous surface layer of the aluminum oxide coating and a boundary surface with the intermediate layer (or the aluminum substrate, if the intermediate layer was absent) was measured in the taken image (SEM image, 200000 times magnification) of the longitudinal cross-section of the bonding interface between the aluminum substrate and the resin. The maximum and the minimum were selected in the cross-sectional image, and the center of the maximum and the minimum was taken as the average value. A normal distribution was determined on the assumption that a difference between the average value and the minimum value was equal to three times the standard deviation, and the average height of the porous surface layer and the distribution (standard deviation) thereof were evaluated. Thus, the average height of the porous surface layer (the average height of the columns) was determined. Table 2 shows the obtained results. Note that, as an example, FIG. 1 shows an SEM image of a longitudinal cross-section of the bonding interface between the aluminum substrate and the resin obtained in Example 2 and a diagram for illustrating the method for calculating the average height of the porous surface layer (the average height of the columns) of the aluminum oxide coating. In FIG. 1, Part (A) is the SEM image of the longitudinal cross-section of the bonding interface between the aluminum substrate and the resin obtained in Example 2 of the present invention for illustrating the method for calculating the average height of the porous surface layer (the average height of the columns) from the average value of the distance, and Part (B) is a diagram showing a normal distribution and a mathematical expression for illustrating the method for calculating the average height of the porous surface layer (the average height of the columns).

Next, SEM images of the surface and cross-section of the porous surface layer of the aluminum oxide coating were taken, and the taken images were analyzed by binarization using the image analysis software ImageJ, followed by the Watershed segmentation process and the like. Thus, the average value of sums of cross-sectional areas of the columns, the average value of sums of circumferential lengths of cross-sections of the columns, and the average value of numbers of the columns of the porous surface layer were determined. Specifically, first, SEM images (8-bit images, gray scale) of the surface and cross-section of the porous surface layer of the aluminum oxide coating were taken. Note that, as an example, Part (A) of FIG. 2 shows an SEM image of a cross-section of the porous surface layer obtained in Example 3.

Next, the images (8-bit images) from which noises were removed were analyzed by using image analysis software ImageJ 1.47. First of all, binarization processing was conducted. In the luminance threshold setting process, a threshold of 130 was set as a boundary visually recognizable as a first layer, and luminances at or above 130 in the 8-bit images were selected. Image (B) of FIG. 2 shows the results. Note that FIG. 2 shows an SEM image of a cross-section of a porous surface layer and diagrams showing a flow of a series of image analysis processes, in which the results of Example 3 are shown as an example.

Subsequently, particles having luminances at or above the set threshold were selected and a separation process of the selected particles was conducted. In this particle separation process, the particles were separated on the basis of the Watershed segmentation process. First, an EDM was created. Next, UEPs were found in the EDM (shown in Image (C) of FIG. 2), and each UEP was dilated as much as possible, until the UEP reached the end (edge) of the particle, or the UEP reached the boundary (edge) of a region of another (adjacent) growing (dilating) UEP, to define the adjacent surfaces (boundary surfaces). Image (D) of FIG. 2 shows the result. Subsequently, the minimum value was determined, and blocks with sizes not smaller than the minimum value were counted. Further, the area, outer periphery, and coordinate of each block were obtained by ImageJ.

Note that the average value of sums of cross-sectional areas of the columns in randomly sampled 400 nm square visual fields of the porous surface layer was obtained as follows. Specifically, an image in a randomly sampled 400 nm square visual field was binarized, and then the areas of the counted blocks (all in the area of the SEM image) were summed up to obtain the total value of the cross-sectional areas of the columns. Five images in 400 nm square visual fields as described above were randomly sampled, and the total value of the cross-sectional areas of the columns in each image was determined. Then, the five total values were averaged, and employed as the above-described average value of sums of cross-sectional areas of the columns in randomly sampled 400 nm square visual fields. Table 2 shows the obtained results.

Next, the average value of sums of circumferential lengths of cross-sections of the columns in randomly sampled 400 nm square visual fields of the porous surface layer was obtained as follows. Specifically, an image in a randomly sampled 400 nm square visual field was binarized, and then the outer peripheries of counted blocks were summed up (all in the area of the SEM image) to obtain the total value of the circumferential lengths of cross-sections of the columns. Five images in 400 nm square visual fields as described above were randomly sampled, and the total value of the circumferential lengths of cross-sections of the columns in each image was determined. Then, the five total values were averaged, and employed as the above-described average value of sums of circumferential lengths of cross-sections of the columns in randomly sampled 400 nm square visual fields. Table 2 shows the obtained results.

Next, the average value of numbers of the columns in randomly sampled 400 nm square visual fields of the porous surface layer was obtained as follows. Specifically, an image in a randomly sampled 400 nm square visual field was binarized, and then the total number of blocks which had been divided by the Watershed segmentation process was obtained. Five images in 400 nm square visual fields as described above were randomly sampled, and the total number of the blocks in each image was determined. Then, the five total numbers were averaged, and employed as the above-described average value of numbers of the columns in randomly sampled 400 nm square visual fields. Table 2 shows the obtained results.

Note that FIG. 3 shows the SEM observation results of the porous surface layer obtained in Example 1 and a graph illustrating a normal distribution used for calculating the average height of the porous surface layer. Part (A) of FIG. 3 shows an SEM image of a cross-section of the porous surface layer. Part (B) of FIG. 3 shows an SEM image of a longitudinal cross-section of the bonding interface between the aluminum substrate and the resin. Part (C) of FIG. 3 shows a diagram showing the result of an image analysis process conducted on the SEM image of the cross-section of the porous surface layer. Part (D) of FIG. 3 shows a graph illustrating a normal distribution used for calculating the average height of the porous surface layer.

Meanwhile, FIG. 4 shows the SEM observation results of the porous surface layer obtained in Example 2 and a graph illustrating a normal distribution used for calculating the average height of the porous surface layer. Part (A) of FIG. 4 shows an SEM image of a cross-section of the porous surface layer. Part (B) of FIG. 4 shows an SEM image of a longitudinal cross-section of the bonding interface between the aluminum substrate and the resin. Part (C) of FIG. 4 shows a diagram showing the result of an image analysis process conducted on the SEM image of the cross-section of the porous surface layer. Part (D) of FIG. 4 shows a graph illustrating a normal distribution used for calculating the average height of the porous surface layer.

In addition, FIG. 5 shows the SEM observation results of the porous surface layer obtained in Example 3 and a graph illustrating a normal distribution used for calculating the average height of the porous surface layer. Part (A) of FIG. 5 shows an SEM image of a cross-section of the porous surface layer. Part (B) of FIG. 5 shows an SEM image of a longitudinal cross-section of the bonding interface between the aluminum substrate and the resin. Part (C) of FIG. 5 shows a diagram showing the result of an image analysis process conducted on the SEM image of the cross-section of the porous surface layer. Part (D) of FIG. 5 shows a graph illustrating a normal distribution used for calculating the average height of the porous surface layer.

<Observation of Porous Intermediate Layer>

By SEM observation of the aluminum oxide coating of each of the injection molded articles (metal-resin composite materials) obtained in Examples 1 to 3, the average film thickness of the porous intermediate layer, the average pore diameter of the fine recessed portions, and the average inter-pore distance of the fine recessed portions were determined. First, a thin sample was prepared by using an ultramicrotome. Next, SEM images (8-bit images, gray scale) of a randomly sampled surface portion of the porous intermediate layer of the aluminum oxide coating and a longitudinal cross-section of the bonding interface between the aluminum substrate and the resin were taken. Subsequently, by SEM observation of these cross-sections, the average film thickness of the porous intermediate layer, the average pore diameter of the fine recessed portions, and the average inter-pore distance of the fine recessed portions were determined.

Note that the average film thickness of the porous intermediate layer was obtained as follows. Specifically, a longitudinal cross-section of the bonding interface between the aluminum substrate and the resin was observed by an SEM (40000 times magnification). In the SEM image, the distance between an upper end of the porous intermediate layer of the aluminum oxide coating and the boundary surface with the aluminum substrate was measured. The distance was measured for five or more randomly sampled cross-sections. The average value of the distances was calculated, and employed as the average film thickness of the intermediate layer. Table 2 shows the obtained results.

Next, the average pore diameter of the fine recessed portions of the porous intermediate layer was obtained as follows. A surface portion of the porous intermediate layer of the aluminum oxide coating was observed by an SEM (40000 times magnification). Five pores were randomly sampled from the SEM image. The distance between the most distant two points in each pore was employed as the pore diameter, and the average value of the five pore diameters was employed as the average pore diameter. Table 2 shows the obtained results.

Next, the average inter-pore distance of the fine recessed portions of the porous intermediate layer was obtained as follows. Specifically, a surface portion of the porous intermediate layer of the aluminum oxide coating was observed by an SEM (40000 times magnification). Five pores were randomly sampled from the SEM image. The distance between the centers of each pore and the nearest pore to the pore was employed as the inter-pore distance. The average value of the five inter-pore distances was employed as the average inter-pore distance. Table 2 shows the obtained results.

Note that FIG. 6 shows an SEM image of a longitudinal cross-section of the porous intermediate layer obtained in Example 1.

In addition, FIG. 7 shows SEM images of a longitudinal cross-section of the porous intermediate layer obtained in Example 2. Part (A) of FIG. 7 shows an SEM image of the longitudinal cross-section of the porous intermediate layer. Part (B) of FIG. 7 shows a partially enlarged photograph of Part (A) of FIG. 7 on the aluminum substrate side.

In addition, FIG. 8 shows SEM images of a longitudinal cross-section of the porous intermediate layer obtained in Example 3. Part (A) of FIG. 8 shows an SEM image of the longitudinal cross-section of the porous intermediate layer. Part (B) of FIG. 8 shows a partially enlarged photograph of Part (A) of FIG. 8 on the aluminum substrate side.

Example 4

An injection molded article in which an aluminum sample (10 mm×50 mm×t1 mm) and a resin (10 mm×40 mm×t2 mm) were bonded to each other (overlapping portion: 10 mm×10 mm) was fabricated by forming an aluminum oxide coating on a surface of the aluminum sample in the same manner as in Example 1, and conducting injection molding in the same manner as in Example 1, except that a JIS A6063 aluminum sample was used, nylon 6 (a nylon 6 "UBE nylon 1015GU6" manufactured by Ube Industries, Ltd., abbreviated as "PA6-1") was used as the injection molded resin, and the anodization treatment conditions were changed to the conditions shown in Table 1. The obtained injection molded article was subjected to a tensile shear test in the same manner as in Example 1. Table 2 shows the obtained results.

Comparative Example 1

An injection molded article for comparison in which an aluminum sample (10 mm×50 mm×t1 mm) and a resin (10 mm×40 mm×t2 mm) were bonded to each other (overlapping portion: 10 mm×10 mm) was fabricated by preparing the aluminum sample in the same manner as in Example 1, and conducting injection molding on a surface of the aluminum sample in the same manner as in Example 1. The obtained injection molded article for comparison was subjected to a tensile shear test in the same manner as in Example 1. Table 2 shows the obtained results.

Comparative Example 2

An aluminum sample was prepared in the same manner as in Example 1, and an aluminum oxide coating was formed on a surface of the aluminum sample in the same manner as in Example 1, except that the anodization treatment conditions were changed to the conditions shown in Table 1. Next, injection molding was conducted on the surface of the aluminum sample on which the aluminum oxide coating was formed in the same manner as in Example 1. Thus, an injection molded article for comparison in which the aluminum sample (10 mm×50 mm×t1 mm) and the resin (10 mm×40 mm×t2 mm) were bonded to each other (overlapping portion: 10 mm×10 mm) was fabricated. The obtained injection molded article for comparison was subjected to a tensile shear test in the same manner as in Example 1. Table 2 shows the obtained results.

In addition, the aluminum oxide coating in the injection molded article for comparison obtained in Comparative Example 2 was observed by an SEM in the same manner as in Example 1. Table 2 shows the obtained results.

Note that FIG. 9 shows the SEM observation results of the aluminum oxide coating of the injection molded article for comparison of Comparative Example 2. Part (A) of FIG. 9 shows an SEM image of a longitudinal cross-section of the aluminum sample and the aluminum oxide coating. Part (B) of FIG. 9 shows an SEM image of a surface of the aluminum oxide coating. Part (C) of FIG. 9 shows an enlarged SEM image of the longitudinal cross-section of the aluminum oxide coating on the surface side.

Comparative Examples 3 to 12

Injection molded articles for comparison in each of which an aluminum sample (10 mm×50 mm×t1 mm) and a resin (10 mm×40 mm×t2 mm) were bonded to each other (overlapping portion: 10 mm×10 mm) were each fabricated by forming an aluminum oxide coating on a surface of the aluminum sample in the same manner as in Example 1, and conducting injection molding in the same manner as in Example 1, except that nylon 6 (a nylon 6 "UBE nylon 1022B" manufactured by Ube Industries, Ltd., hereinafter abbreviated as "PA6-2") was used as the injection molded resin, and the anodization treatment conditions were changed to the conditions shown in Table 1. The obtained injection molded articles for comparison were subjected to a tensile shear test in the same manner as in Example 1. Table 2 shows the obtained results.

In addition, the aluminum oxide coatings in the injection molded articles for comparison obtained in Comparative Examples 3 and 5 were observed by an SEM in the same manner as in Example 1. Table 2 shows the obtained results.

Comparative Example 13

An injection molded article for comparison in which an aluminum sample (10 mm×50 mm×t1 mm) and a resin (10 mm×40 mm×t2 mm) were bonded to each other (overlapping portion: 10 mm×10 mm) was fabricated by conducting injection molding on a surface of the aluminum sample in the same manner as in Comparative Example 1, except that nylon 6 (a nylon 6 "UBE nylon 1022B" manufactured by Ube Industries, Ltd., hereinafter abbreviated as "PA6-2") was used as the injection molded resin. The obtained injection molded article for comparison was subjected to a tensile shear test in the same manner as in Example 1. Table 2 shows the obtained results.

TABLE 1

| | Voltage (V); Treatment time (min) | Concentration of electrolytic solution [wt %] | Resin |
|---|---|---|---|
| Example 1 | 10; 15, 5; 7.5 | 10 | PPS |
| Example 2 | 15; 15, 5; 15 | 10 | PPS |
| Example 3 | 20; 15, 5; 30 | 10 | PPS |
| Example 4 | 10; 15, 5; 7.5 | 10 | PA6-1 |
| Comp. Ex. 1 | — | — | PPS |
| Comp. Ex. 2 | 15; 15 | 10 | PPS |
| Comp. Ex. 3 | 24; 15 | 10 | PA6-2 |
| Comp. Ex. 4 | 20; 15 | 10 | PA6-2 |
| Comp. Ex. 5 | 10; 15 | 10 | PA6-2 |
| Comp. Ex. 6 | 10; 10 | 10 | PA6-2 |
| Comp. Ex. 7 | 10; 15 | 10 | PA6-2 |
| Comp. Ex. 8 | 10; 20 | 10 | PA6-2 |
| Comp. Ex. 9 | 10; 15 | 5 | PA6-2 |
| Comp. Ex. 10 | 10; 15 | 10 | PA6-2 |
| Comp. Ex. 11 | 10; 15 | 20 | PA6-2 |
| Comp. Ex. 12 | 10; 15 | 50 | PA6-2 |
| Comp. Ex. 13 | — | — | PA6-2 |

TABLE 2

| | Average height of columns [nm] | Average value of sums of cross-sectional areas of columns [nm$^2$] | Average value of sums of circumferential lengths of cross-sections of columns [nm] | Average value of numbers of columns [columns] | Average film thickness of porous intermediate layer [nm] | Average pore diameter of fine recessed portions [nm] | Average inter-pore distance of fine recessed portions [nm] | Result of tensile shear test [MPa] |
|---|---|---|---|---|---|---|---|---|
| Example 1 | 50 | 66508 | 14982 | 195 | 650 | 10 | 25 | 23.4 |
| Example 2 | 32.5 | 66226 | 14250 | 173 | 1800 | 15 | 40 | 22.6 |
| Example 3 | 27.5 | 41277 | 11430 | 162 | 18000 | 20 | 50 | 20.1 |
| Example 4 | — | — | — | — | — | — | — | 15 |
| Comp. Ex. 1 | — | — | — | — | — | — | — | 0 |
| Comp. Ex. 2 | — | — | — | — | 1600 | 15 | 40 | 0.64 |
| Comp. Ex. 3 | — | — | — | — | 8000 | 20 | 50 | 3.4 |
| Comp. Ex. 4 | — | — | — | — | — | — | — | 3.5 |
| Comp. Ex. 5 | — | — | — | — | 350 | 5 | 30 | 5.7 |
| Comp. Ex. 6 | — | — | — | — | — | — | — | 3.4 |
| Comp. Ex. 7 | — | — | — | — | — | — | — | 3.4 |
| Comp. Ex. 8 | — | — | — | — | — | — | — | 4.4 |
| Comp. Ex. 9 | — | — | — | — | — | — | — | 4.5 |
| Comp. Ex. 10 | — | — | — | — | — | — | — | 5.3 |
| Comp. Ex. 11 | — | — | — | — | — | — | — | 6.3 |
| Comp. Ex. 12 | — | — | — | — | — | — | — | 0.6 |
| Comp. Ex. 13 | — | — | — | — | — | — | — | 0 |

(Evaluation Test Results)

As is apparent from the results shown in FIGS. 3 to 5, it was found that the aluminum oxide coatings before the injection molding obtained in Examples 1 to 3 each had a porous surface layer in which columns were arranged in a dispersed state.

In addition, as is apparent from the results shown in Table 2, it was found that in the aluminum oxide coatings before the injection molding obtained in Examples 1 to 3, the average height of the porous surface layer (the average height of the columns) was in the range from 10 to 100 nm, the average value of sums of cross-sectional areas of the columns in randomly sampled 400 nm square visual fields of the porous surface layer was in the range from 8000 to 128000 nm², the average value of numbers of the columns in randomly sampled 400 nm square visual fields of the porous surface layer was in the range from 10 to 430, and the average value of sums of circumferential lengths of cross-sections of the columns in randomly sampled 400 nm square visual fields of the porous surface layer was in the range from 1000 to 27000 nm, and hence a metal-resin composite material in which an aluminum substrate and a resin were more firmly bonded to each other was obtained in each of Examples 1 to 3. Especially in the case of Example 1, it was found that a metal-resin composite material in which the aluminum substrate and the resin were firmly bonded to each other at a higher level was obtained.

On the other hand, as is apparent from the results shown in FIG. 9, it was found that the injection molded article for comparison obtained in Comparative Example 2 had an aluminum oxide layer in which many pores were formed, but the porous surface layer in which columns were arranged in a dispersed state was not observed.

In addition, as is apparent from the results shown in Table 2, it was found that a metal-resin composite material in which the aluminum substrate and the resin were bonded as firmly as in Examples 1 to 4 was not obtained in Comparative Examples.

INDUSTRIAL APPLICABILITY

As described above, according to the present invention, it is possible to provide a metal-resin composite material in which an aluminum substrate and a resin are more firmly bonded to each other, a method for producing a metal-resin composite material by which an aluminum substrate and a resin material can be firmly bonded to each other in a simple manner, and an aluminum substrate having an aluminum oxide coating excellent in adhesion to a resin.

Accordingly, the metal-resin composite material, the method for producing the same, and the aluminum substrate having an aluminum oxide coating of the present invention are useful, because they can be suitably used for components and products made of metal-resin composite materials used in various fields such as home appliances products, mobile phones, automobile components, personal computers, and electronic components.

The invention claimed is:

1. A metal-resin composite material comprising an aluminum substrate having an aluminum oxide coating and a resin bonded to the aluminum substrate through the aluminum oxide coating, wherein
   the aluminum oxide coating comprises:
      a porous surface layer in which columns with an average height of 10 to 100 nm are arranged in a dispersed state, and
      a porous intermediate layer which is formed at an aluminum substrate side of the porous surface layer and which has fine recessed portions,
   an average value of sums of cross-sectional areas of the columns in randomly sampled 400 nm square visual fields of the porous surface layer is 8000 to 128000 nm²,
   an average value of numbers of the columns in randomly sampled 400 nm square visual fields of the porous surface layer is 10 to 430,
   the columns are substantially cylindrical in shape and are spaced apart.
   the porous intermediate layer has an average film thickness of 500 nm to 20 μm,
   the fine recessed portions have an average pore diameter of 5 to 50 nm,
   the fine recessed portions have an average inter-pore distance of 5 to 90 nm, and
   the porous intermediate layer is a layer that is formed from a second anodization step below the porous surface layer, which was formed by a first anodization step.

2. The metal-resin composite material according to claim 1, wherein
   an average value of sums of circumferential lengths of cross-sections of the columns in randomly sampled 400 nm square visual fields of the porous surface layer is 1000 to 27000 nm.

3. A method for producing a metal-resin composite material comprising:
   an aluminum substrate comprising:
      an aluminum oxide coating that comprises:
      a porous surface layer, and
      a porous intermediate layer which is formed at an aluminum substrate side of the porous surface layer and which has fine recessed portions, and
   a resin bonded to the aluminum substrate through the aluminum oxide coating;
   the method comprising;
   subjecting an aluminum substrate to a first anodization treatment to form, on a surface of the aluminum substrate, the aluminum oxide coating having the porous surface layer in which columns with an average height of 10 to 100 nm are arranged in a dispersed state, an average value of sums of cross-sectional areas of the columns in randomly sampled 400 nm square visual fields being 8000 to 128000 nm², an average value of numbers of the columns in randomly sampled 400 nm square visual fields being 10 to 430, and the columns are substantially cylindrical in shape and are spaced apart; and
   bonding the aluminum substrate to a resin through the aluminum oxide coating having the porous surface layer, wherein
   the porous intermediate layer has an average film thickness of 500 nm to 20 μm,
   the fine recessed portions have an average pore diameter of 5 to 50 nm,
   the fine recessed portions have an average inter-pore distance of 5 to 90 nm, and
   the porous intermediate layer is a layer that is formed from a second anodization step below the porous surface layer, which was formed by the first anodization step.

4. The method for producing a metal-resin composite material according to claim 3, wherein
   in the porous surface layer of the aluminum oxide coating formed on the surface of the aluminum substrate, an average value of sums of circumferential lengths of cross-sections of the columns in randomly sampled 400 nm square visual fields is 1000 to 27000 nm.

5. An aluminum substrate comprising an aluminum oxide coating, wherein
the aluminum oxide coating comprises:
a porous surface layer in which columns with an average height of 10 to 100 nm are dispersed across the porous layer, and
a porous intermediate layer which is formed at an aluminum substrate side of the porous surface layer and which has fine recessed portions,
an average value of sums of cross-sectional areas of the columns in randomly sampled 400 nm square visual fields of the porous surface layer is 8000 to 128000 $nm^2$,
an average value of numbers of the columns in randomly sampled 400 nm square visual fields of the porous surface layer is 10 to 430,
the columns are substantially cylindrical in shape and are spaced apart,
the porous intermediate layer has an average film thickness of 500 nm to 20
the fine recessed portions have an average pore diameter of 5 to 50 nm,
the fine recessed portions have an average inter-pore distance of 5 to 90 nm, and
the porous intermediate layer is a layer that is formed from a second anodization step below the porous surface layer, which was formed by a first anodization step.

6. The aluminum substrate comprising the aluminum oxide coating according to claim 5, wherein
an average value of sums of circumferential lengths of cross-sections of the columns in randomly sampled 400 nm square visual fields of the porous surface layer is 1000 to 27000 nm.

7. The aluminum substrate comprising the aluminum oxide coating according to claim 5, wherein the porous intermediate layer has an average film thickness of 1800 nm to 20 μm.

* * * * *